US012529990B2

(12) United States Patent
Yin et al.

(10) Patent No.: US 12,529,990 B2
(45) Date of Patent: Jan. 20, 2026

(54) IMAGE-FORMING APPARATUS AND PHASE MATCH METHOD OF PHOTOSENSITIVE PARTS

(71) Applicant: Zhuhai Pantum Electronics Co., Ltd., Zhuhai (CN)

(72) Inventors: Lei Yin, Zhuhai (CN); Haifei Gong, Zhuhai (CN); Zihao Yan, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 139 days.

(21) Appl. No.: 18/522,828

(22) Filed: Nov. 29, 2023

(65) Prior Publication Data

US 2024/0184238 A1 Jun. 6, 2024

(30) Foreign Application Priority Data

Dec. 6, 2022 (CN) ......................... 202211558995.4
Sep. 18, 2023 (CN) ......................... 202311207526.2

(51) Int. Cl.
*G03G 15/00* (2006.01)
*G03G 15/01* (2006.01)

(52) U.S. Cl.
CPC ....... *G03G 15/757* (2013.01); *G03G 15/0105* (2013.01)

(58) Field of Classification Search
None
See application file for complete search history.

(56) References Cited

U.S. PATENT DOCUMENTS 6,173,141 B1 * 1/2001 Sakagami .......... G03G 15/0194 399/167
2005/0047834 A1 3/2005 Tomita et al.
2006/0210313 A1 9/2006 Kosako
2011/0085828 A1 * 4/2011 Kosako .............. G03G 15/6567 399/301
2011/0129255 A1 6/2011 Kinokuni

FOREIGN PATENT DOCUMENTS

JP H09230661 A 9/1997
JP 2005196007 A 7/2005
JP 2007025181 A 2/2007

OTHER PUBLICATIONS

The European Patent Office (EPO) The Extended European Search Report for 23212162.4 Apr. 8, 2024 8 Pages.

* cited by examiner

*Primary Examiner* — Sevan A Aydin

(74) *Attorney, Agent, or Firm* — Anova Law Group, PLLC

(57) ABSTRACT

The present disclosure provides an image-forming apparatus and a phase match method of photosensitive parts. The image-forming apparatus includes a first motor, configured to rotate a first photosensitive part; a second motor, configured to rotate a second photosensitive part; a first phase sensor, configured to detect a first rotation phase of the first photosensitive part; a second phase sensor, configured to detect a second rotation phase of the second photosensitive part; and a control unit, configured to, after at least one page of image-forming job is received and at least one of the first motor and the second motor receives a phase match instruction, perform phase match on the first photosensitive part and the second photosensitive part according to a rotation phase of a photosensitive part corresponding to a motor receiving the phase match instruction.

16 Claims, 11 Drawing Sheets

IMAGE-FORMING APPARATUS AND PHASE MATCH METHOD OF PHOTOSENSITIVE PARTS

CROSS-REFERENCE TO RELATED APPLICATION

The present disclosure claims the priority to Chinese patent application No. 202211558995.4, filed on Dec. 6, 2022, and No. 202311207526.2, filed on Sep. 18, 2023, the entirety of which is incorporated herein by reference.

TECHNICAL FIELD

The present disclosure generally relates to the field of image-forming technology and, more particularly, relates to an image-forming apparatus and a phase match method of photosensitive parts.

BACKGROUND

An image-forming apparatus is a device that forms images on a recording medium through an image-forming principle, such as a printer, a copy machine, a fax machine, a multifunctional image-forming and copying device, an electrostatic printing device, and/or any other similar device. According to color distinction, the image-forming apparatuses may be divided into color image-forming apparatuses and black-and-white image-forming apparatuses. The color image-forming apparatus includes a plurality of photosensitive parts, respectively corresponding to different colors (for example, four colors including yellow Y, magenta M, cyan C, and black K). Toner images of different colors may be formed on the surface of the photosensitive parts of different colors and then may be transferred to a transferring belt in sequence. The toner images of different colors may be overlapped with each other to form color images.

In image-forming jobs, if a same point on the image has different rotation phases when being developed and transferred by different photosensitive drums, corresponding instantaneous speed of the point in different photosensitive drums may be different, which may lead to overlapping differences of toner images of different colors (i.e., color mismatch) and image quality reduction. Therefore, it needs to control the rotation phases of photosensitive parts of different colors to prevent color mismatch.

Photosensitive parts of different colors are phase-matched before performing image-forming jobs. However, performing phase match before executing the image-forming jobs may increase the output time of the first page or multiple pages of image-forming jobs, which may affect user experience.

SUMMARY

One aspect of the present disclosure provides an image-forming apparatus. The image-forming apparatus includes a first motor, configured to rotate a first photosensitive part; a second motor, configured to rotate a second photosensitive part; a first phase sensor, configured to detect a first rotation phase of the first photosensitive part; a second phase sensor, configured to detect a second rotation phase of the second photosensitive part; and a control unit, configured to, after at least one page of image-forming job is received and at least one of the first motor and the second motor receives a phase match instruction, perform phase match on the first photosensitive part and the second photosensitive part according to a rotation phase of a photosensitive part corresponding to a motor receiving the phase match instruction, where the phase match instruction is configured to indicate that the phase match needs to be performed on the first photosensitive part and the second photosensitive part.

Another aspect of the present disclosure provides a phase match method of photosensitive parts, applied to an image-forming apparatus, where the image-forming apparatus includes a first motor, configured to rotate a first photosensitive part; a second motor, configured to rotate a second photosensitive part; a first phase sensor, configured to detect a first rotation phase of the first photosensitive part; a second phase sensor, configured to detect a second rotation phase of the second photosensitive part. The method includes, after at least one page of image-forming job is received and at least one of the first motor and the second motor receives a phase match instruction, performing phase match on the first photosensitive part and the second photosensitive part according to a rotation phase of a photosensitive part corresponding to a motor receiving the phase match instruction, where the phase match instruction is configured to indicate that the phase match needs to be performed on the first photosensitive part and the second photosensitive part.

Another aspect of the present disclosure provides a phase match method of photosensitive parts, applied to an image-forming apparatus, where the image-forming apparatus includes a first motor, configured to rotate a first photosensitive part; a second motor, configured to rotate a second photosensitive part; a first phase sensor, configured to detect a first rotation phase of the first photosensitive part; a second phase sensor, configured to detect a second rotation phase of the second photosensitive part. The method includes, when the first phase sensor detects a first preset phase signal, controlling the first motor to stop rotation after delaying a first variable time; and/or when the second phase sensor detects a second preset phase signal, controlling the second motor to stop rotation after delaying a second variable time, where after both the first motor and the second motor stop rotation, a phase difference between the first photosensitive part and the second photosensitive part is less than or equal to a preset phase difference threshold.

Other aspects of the present disclosure can be understood by those skilled in the art in light of the description, the claims, and the drawings of the present disclosure.

BRIEF DESCRIPTION OF THE DRAWINGS

To clearly describe technical solutions of various embodiments of the present disclosure, the drawings which need to be used for describing various embodiments are described below. Obviously, the drawings in the following description are merely some embodiments of the present disclosure. For those skilled in the art, other drawings may be obtained in accordance with the drawings without creative efforts.

DETAILED DESCRIPTION

In order to better understand the technical solutions of the present disclosure, embodiments of the present disclosure are described in detail below with reference to accompanying drawings.

It should be understood that described embodiments are only some of embodiments of the present disclosure, rather than all of embodiments. According to embodiments in present disclosure, all other embodiments obtained by those skilled in the art without making creative efforts should fall within the protection scope of present disclosure.

The terms used in embodiments of the present disclosure are only for the purpose of describing specific embodiments and not intended to limit the present disclosure. As used in embodiments and appended claims, the singular forms "a," "the" and "said" are also intended to include plural forms, unless the context clearly dictates otherwise.

It should be understood that the term "and/or" used in the present disclosure is only an association relationship describing related objects, indicating that there may be three relationships. For example, A and/or B may indicate three cases: A alone, both A and B, and B alone. In addition, the character "/" in the present disclosure indicate that related objects are an "or" relationship.

Figure 1:
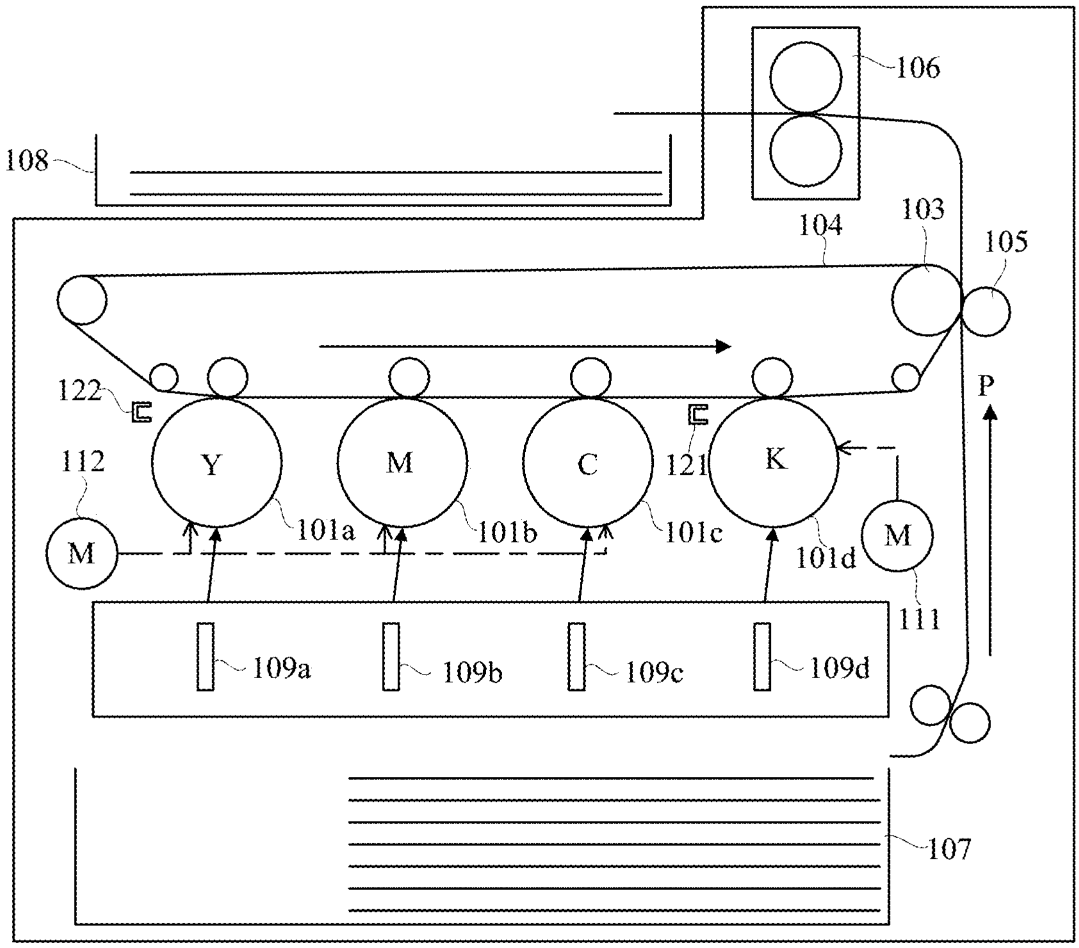
FIG. 1 illustrates a structural schematic of an image-forming apparatus provided by exemplary embodiments of the present disclosure.

Referring to FIG. 1, FIG. 1 illustrates a structural schematic of an image-forming apparatus provided by exemplary embodiments of the present disclosure. FIG. 1 mainly depicts a portion where a toner image is transferred to a recording medium. The image-forming apparatus may be a color image-forming apparatus and include four image-forming units for forming yellow toner images, magenta toner images, cyan toner images, and black toner images.

Each image-forming unit may include one of the photosensitive drums 101*a*-101*d* serving as a rotating part. The suffixes "a" to "d" of the reference numerals 101*a*-101*d* for the photosensitive drums represent "yellow", "magenta", "cyan" and "black", respectively. That is, the photosensitive drum 101*a* is a photosensitive part for forming yellow toner images, the photosensitive drum 101*b* is a photosensitive part for forming magenta toner images, the photosensitive drum 101*c* is a photosensitive part for forming cyan toner images, and the photosensitive drum 101*d* is a photosensitive part for forming black toner images. It should be noted that the photosensitive drums 101*a*-101*c* may also be collectively referred to as "color photosensitive drums". The definition for suffixes a-d also apply to the laser scanners 109*a*-109*d*.

The photosensitive drum 101*d* may be driven through a gear by a first motor 111 configured for a monochrome photosensitive drum; the photosensitive drums 101*a*-101*c* may be driven through a gear by a second motor 112 configured for a color photosensitive drum. The first motor 111 and the second motor 112 may be DC (direct current) brushless motors. The photosensitive drums 101*a*-101*c* may be assembled, such that the eccentric components for the rotation axis of the photosensitive drum and the rotation axis of the gear may be cancelled out, and the periods of peripheral speed changes caused by the eccentricity of the photosensitive drums 101*a*-101*c* may have same phase. Since the photosensitive drums 101*a*-101*c* are driven by single second motor 112, the photosensitive drums 101*a*-101*c* may rotate in same phase. Therefore, the photosensitive drums 101*a*-101*c* may be rotationally driven while keeping same phase. The rotation phase of the photosensitive drums 101*a*-101*c* may be detected by a second phase sensor 122; the rotation phase of the photosensitive drum 101*d* may be detected by a first phase sensor 121. The configuration of the first phase sensor 121 and the second phase sensor 122 is described in detail below. It can be understood that the first motor and the second motor in embodiments of the present disclosure may include one or more motors for driving the photosensitive drums 101*a*-101*d*, that is, each photosensitive drum may be configured with a separate motor for driving its rotation and a corresponding gear. The second phase sensor may include a phase sensor respectively configured to detect at least one phase of the photosensitive drums 101*a*-101*d*, that is, each of the photosensitive drums 101*a*-101*d* may be configured with an independent phase sensor to detect the rotation phase. For example, if the first motor is configured to drive the monochrome photosensitive drum 101*d* through a gear, the second motor may be a motor for driving at least one of the color photosensitive drums 101*a*-101*c*. That is, the second motor may include at least one motor for respectively driving the color photosensitive drums 101*a*-101*c*. The first phase sensor may be configured to detect the rotation phase of the monochromatic photosensitive drum. The second phase sensor may be configured to detect the rotation phase of at least one of the color photosensitive drums 101*a*-101*c*. That is, the second phase sensor may include at least one phase sensor for detecting the rotation phase of at least one of the color photosensitive drums 101*a*-101*c*.

Each of developing units (not shown in drawings, each photosensitive drum corresponds one developing unit) may deposit toner (i.e., developer) on a latent image formed on one of the photosensitive drums 101a-101d to form a toner image, such that the latent image may be visualized. The latent image on each of the photosensitive drums 101a-101d may be formed by performed exposure according to an image signal by one of the laser scanners 109a-109d. The toner images (used as visible images) formed on the photosensitive drums 101a-101d may be sequentially transferred to a transferring belt 104 rotated by a driving roller 103.

The toner images transferred to the transferring belt 104 may be simultaneously transferred to a recording medium by a transferring roller 105. The recording medium on which the toner images are transferred may be conveyed to a fixing unit 106. The fixing unit 106 may include a fixing roller driven by a fixing-driving motor. In the fixing unit 106, the toner images may be fixed to the recording medium by heating.

In embodiments of the present disclosure, when receiving an image-forming job instruction, the image-forming apparatus may send image signals of each color to the laser scanners 109a-109d, and latent images may be formed on the photosensitive drums 101a-101d. The four-color latent images formed on the photosensitive drums 101a-101d may be respectively developed by the developing units, and four-color toner images may be formed on the photosensitive drums 101a-101d. The four-color toner images may be transferred to the transferring belt 104 driven and rotated by the driving roller 103 to be overlapped with each other.

Subsequently, the recording medium may be conveyed from a paper feed box 107 along the direction indicated by an arrow P. The toner images formed on the transferring belt 104 may be transferred to the recording medium by the transferring roller 105. The toner images transferred to the recording medium may be then fixed to the recording medium by the fixing unit 106 under the action of heat and pressure. Next, the recording medium may be discharged onto a paper output tray 108.

Figure 2:
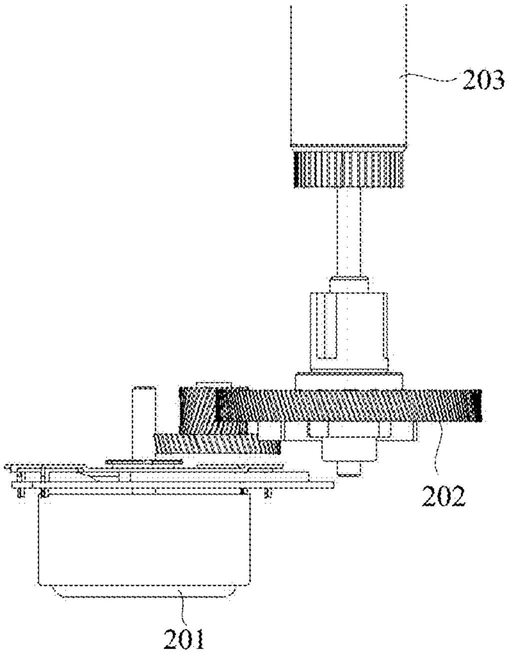
FIG. 2 illustrates a schematic of a driving system of a photosensitive drum provided by exemplary embodiments of the present disclosure.

Referring to FIG. 2, FIG. 2 illustrates a schematic of a driving system of a photosensitive drum provided by exemplary embodiments of the present disclosure. As shown in FIG. 2, a motor 201 may be connected to a photosensitive drum 203 through a gear 202. When the motor 201 rotates, the motor 201 may drive the photosensitive drum 203 to rotate at a corresponding speed through the gear 202. It should be noted that FIG. 2 may be only a schematic illustration of the driving system of the photosensitive drum according to embodiments of the present disclosure; and specific driving forms (for example, gear type, gear arrangement and/or the like) may not be limited in embodiments of the present disclosure.

In practical applications, the shape error of the gear may cause periodic fluctuations in the peripheral linear speed, and such fluctuation may be different in gears produced by different molds. Therefore, same image-forming apparatus may require gears with same mold and same cavity to ensure that the photosensitive drums of different colors (for example, the photosensitive drums 101a-101d in FIG. 1) have same fluctuation period. However, in image-forming jobs, if a same point on the image has different rotation phases when being developed and transferred by different photosensitive drums, corresponding instantaneous speed of the point in different photosensitive drums may be different.

Figure 3:
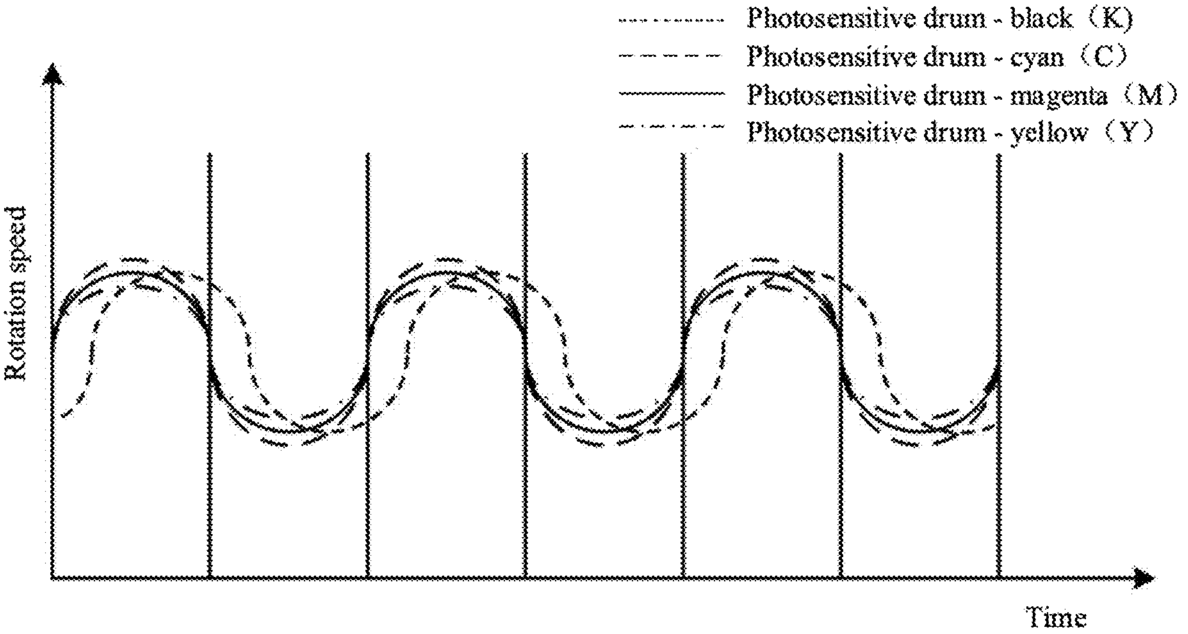
FIG. 3 illustrates a phase diagram of a photosensitive part provided by exemplary embodiments of the present disclosure.

Referring to FIG. 3, FIG. 3 illustrates a phase diagram of a photosensitive part provided by exemplary embodiments of the present disclosure. As shown in FIG. 3, the phases of the photosensitive parts (i.e., the photosensitive drums) of four colors are inconsistent, which may result in different instantaneous speeds corresponding to same point in different photosensitive drums and further result in differences in the overlapping of the toner images of different colors (i.e., color mismatch) and image quality reduction. Therefore, it needs to control the rotation phases of the photosensitive drums of different colors to prevent color mismatch. It should be noted that the rotation phase of the gear may match the rotation phase of the photosensitive drum driven by the gear. Therefore, the rotation phase of the gear may also be referred to the rotation phase of the photosensitive drum. Accordingly, the phase match of the rotation phase of the gear is the phase match of the rotation phase of the photosensitive drum.

Phase match may be performed on the photosensitive drums of different colors before performing the image-forming job. However, performing phase match before executing the image-forming job may increase the output time of the first-page image-forming job and affect the user experience.

Figure 4:
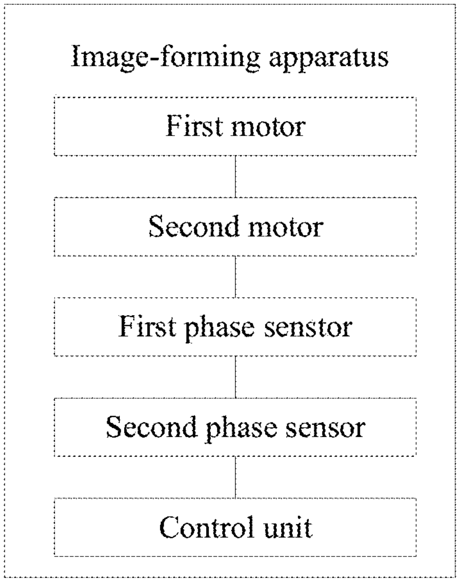
FIG. 4 illustrates a structural block diagram of an image-forming apparatus provided by exemplary embodiments of the present disclosure.

To solve above problem, embodiments of the present disclosure provide an image-forming apparatus, a phase match method for the photosensitive parts, and a storage medium. After completing at least one page of image-forming job and at least one of the first motor and the second motor receives the phase match instruction, the phase match may be performed on the first photosensitive part and the second photosensitive part according to the rotation phases of the photosensitive parts corresponding to the motor that received the phase match instruction. The phase match may be performed after the first page or multiple pages of image-forming job is completed, which may avoid the situation in the existing technology that performing the phase match before executing the image-forming job may increase the output time of the first page of image-forming job to affect user experience. In the present disclosure, it may reduce the output time of the first page or multiple pages of the first page image-forming job by performing phase match of two motors after completing at least one page of image-forming job, which is described in detail below with reference to accompanying drawings. Referring to FIG. 4, FIG. 4 illustrates a structural block diagram of an image-forming apparatus provided by exemplary embodiments of the present disclosure. As shown in FIG. 4, the image-forming apparatus may mainly include the following functional units.

The first motor may be configured to rotate the first photosensitive part.

Figure 5:
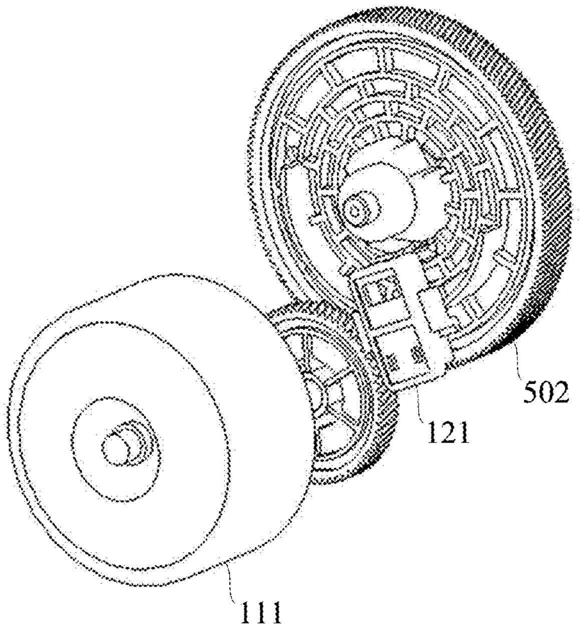
FIG. 5 illustrates a schematic of a driving system of a first photosensitive part provided by exemplary embodiments of the present disclosure.

Referring to FIG. 5, FIG. 5 illustrates a schematic of a driving system of a first photosensitive part provided by exemplary embodiments of the present disclosure. As shown in FIG. 5, the driving system may include a first motor 111 and a first gear 502. The first motor 111 may be coupled to the first gear 502, and the first motor 111 may drive the first gear 502 to rotate, thereby driving the first photosensitive part to rotate. In an implementation, the first photosensitive part may be a black photosensitive part, that is, a photosensitive part configured to form black toner images. The first photosensitive part may also be at least one of a yellow photosensitive part, a magenta photosensitive part and a cyan photosensitive part. The yellow photosensitive part is a photosensitive part configured to form yellow toner images, the magenta photosensitive part is a photosensitive part configured to form magenta toner images, and the cyan photosensitive part is a photosensitive part configured to form cyan toner images.

It should be noted that that the photosensitive part in embodiments of the present disclosure may also be referred to "photosensitive drum", "toner cartridge" or the like, which may not be limited in embodiments of the present disclosure.

The second motor may be configured to rotate the second photosensitive part.

In an optional implementation, the second photosensitive part may include at least one of the yellow photosensitive part, the magenta photosensitive part and the cyan photosensitive part. The yellow photosensitive part is a photosensitive part configured to form yellow toner images, the magenta photosensitive part is a photosensitive part configured to form magenta toner images, and the cyan photosensitive part is a photosensitive part configured to form cyan toner images.

When the first photosensitive part is one of the yellow photosensitive part, the magenta photosensitive part and the cyan photosensitive part, the second photosensitive part may be another one of the yellow photosensitive part, the magenta photosensitive part and the cyan photosensitive part. For example, the first photosensitive part is the yellow photosensitive part, and the second photosensitive part may be either the magenta photosensitive part or the cyan photosensitive part. For example, the second photosensitive part may be the magenta photosensitive part.

The phase match discussed below may be the match between the black photosensitive part with at least one of the yellow photosensitive part, the magenta photosensitive part and the cyan photosensitive part; and may also be the match between one of the yellow photosensitive part, the magenta photosensitive part and the cyan photosensitive part with another one of the yellow photosensitive part, the magenta photosensitive part and the cyan photosensitive part.

After completing at least one page of image-forming job and at least one of the first motor and the second motor receives the phase match instruction, the phase match of the first photosensitive part and the second photosensitive part according to the rotation phases of the photosensitive parts corresponding to the motor that received the phase match instruction may include at least any one of following scenarios.

1) When printing a black-and-white job, only the black (K color) image-forming part may need to be used, and the image-forming parts of the yellow (Y color), magenta (M color), and cyan (C color) may not need to be used. Therefore, the match may only be performed on the black image-forming part, and there is no need to turn on the yellow image-forming part, the magenta image-forming part, and the cyan image-forming part. When match is needed, the motor configured to drive the black photosensitive part, such as the first motor, may receive the phase match instruction, and current rotation phase of the black photosensitive part may need to be detected after receiving the phase match instruction; and the motor that drives the black photosensitive part may be controlled to be matched with the yellow photosensitive part, the magenta photosensitive part, and the cyan photosensitive part according to detected rotation phases. At this point, there is no need to start the motors (e.g., the second motor) configured to drive the yellow photosensitive part, the magenta photosensitive part and the cyan photosensitive part. The match manner may refer to detailed description below.

2) In special printers, such as a red-black printer or other printers that may separately use the yellow photosensitive part, the magenta photosensitive part, and the cyan photosensitive part for image-formation, the colors printed in the red-black printer may only require red and black, and the rotation of at least one of the yellow photosensitive part, the magenta photosensitive part and the cyan photosensitive part may be independently controlled for printing. Therefore, when printing is performed, it needs to separately control at least two of the yellow photosensitive part, the magenta photosensitive part, and the cyan photosensitive part for matching. For example, the yellow photosensitive part may be matched with the magenta photosensitive part, and the yellow photosensitive part may be matched with the cyan photosensitive part. When color printing is performed, only the yellow photosensitive part, the magenta photosensitive part, and the cyan photosensitive part may be turned on, and the black photosensitive part may not be turned on. Therefore, the motors configured to drive the yellow photosensitive part, the magenta photosensitive part, and the cyan photosensitive part may detect current rotation phases of the yellow photosensitive part, the magenta photosensitive part, and the cyan photosensitive part after receiving the match instruction; and the motors configured to drive the yellow photosensitive part, the magenta photosensitive part, and the cyan photosensitive part may be matched with the black photosensitive part according to detected rotation phases. At this point, there is no need to start the motor configured to drive the black photosensitive part. The match manner may refer to detailed description below.

3) When color printing requiring four colors of toner is performed, the image-forming parts of the black (K color), yellow (Y color), magenta (M color), cyan (C color) may be used. Therefore, the match may be performed on the first motor and the second motor that control the black (K color) image-forming part, and the photosensitive parts of the yellow (Y color), magenta (M color), and cyan (C color) (multiple motors may be configured to control four photosensitive parts; for example, one motor may be configured for the CMY colors and one motor may be configured for the K color). Therefore, current rotation phases of the black photosensitive part, the yellow photosensitive part, the magenta photosensitive part, and the cyan photosensitive part may need to be detected after the first motor and the second motor receive the phase match instruction respectively; and the motors configured to drive the yellow photosensitive part, the magenta photosensitive part, and the cyan photosensitive part may be controlled to be matched with the motor configured to drive the black photosensitive part according to detected rotation phases.

Therefore, in above implementation manner, one of the first motor and the second motor after receiving the match instruction may be matched with another motor that does not receive the match instruction; or after both motors receive the match instruction, the rotation phases of the photosensitive parts corresponding to the motors may be respectively detected, and matching may be performed, which may not be limited in the present disclosure.

Figure 6:
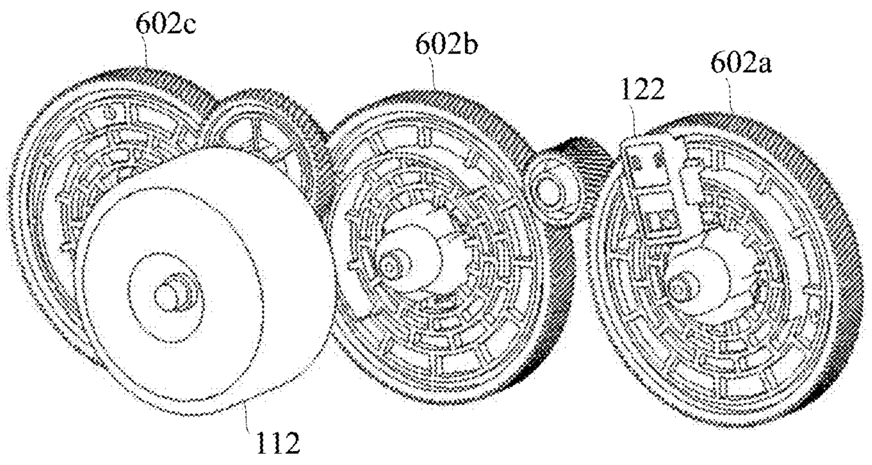
FIG. 6 illustrates a schematic of a driving system of a second photosensitive part provided by exemplary embodiments of the present disclosure.

Referring to FIG. 6, FIG. 6 illustrates a schematic of a driving system of the second photosensitive part provided by exemplary embodiments of the present disclosure. As shown in FIG. 6, the drive system may include a second motor 112 and second gears 602*a*-602*c*. The second gear 602*a* may be configured to drive the yellow photosensitive part to rotate, the second gear 602*b* may be configured to drive the magenta photosensitive part to rotate, and the second gear 602*c* may be configured to drive the cyan photosensitive part to rotate. That is, the second motor 112 may drive three photosensitive parts to rotate simultaneously. It can be understood that the second motor may also include a plurality of gears respectively configured to drive the yellow photosensitive part to rotate, the magenta photosensitive part to rotate and the cyan photosensitive drum to rotate. That is, each photosensitive part may be disposed with a driving system for driving corresponding photosensitive part. The second motor may also include at least one of a plurality of gears for driving the yellow photosensitive part to rotate, the magenta photosensitive part to rotate and the cyan photosensitive drum to rotate, which may not be limited in the present disclosure.

In an implementation, the second gears 602*a*-602*c* may be installed in phase-matching positions during installation, and the second gears 602*a*-602*c* may be driven by same motor. Therefore, the phases of the second gears 602*a*-602*c* may be always matched. Correspondingly, the phases of the yellow photosensitive part, the magenta photosensitive part and the cyan photosensitive part may be always matched. For example, in FIG. 3, corresponding phases of the yellow photosensitive part, the magenta photosensitive part and the cyan photosensitive part may be consistent; the phase of the black photosensitive drum may be different from the phases of other photosensitive drums. Therefore, when performing phase configuration in subsequent steps, it may only need to match the black photosensitive part with any one of the yellow photosensitive part, the magenta photosensitive part and the cyan photosensitive part. For example, the black photosensitive part may be matched with the yellow photosensitive part.

It should be noted that that FIG. 5 and FIG. 6 may be only illustrative description of embodiments of the present disclosure and should not be configured to limit the protection scope of the present disclosure. For example, in some optional implementations, the second photosensitive part may only include one photosensitive part; or the first photosensitive parts may include multiple photosensitive parts, and the first motor may drive the multiple photosensitive parts; or the first photosensitive parts and the second photosensitive parts may all include multiple photosensitive parts, and the first motor and the second motor may each drive the multiple photosensitive parts respectively. The first phase sensor may be configured to detect the first rotation phase of the first photosensitive part.

Figure 7:
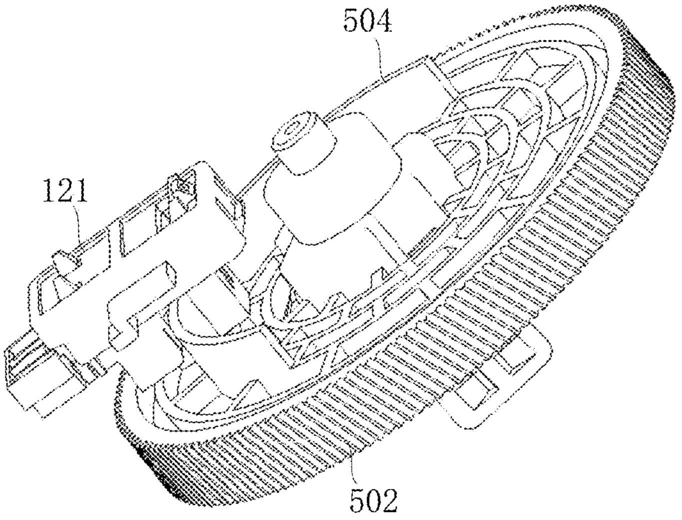
FIG. 7 illustrates a schematic of phase detection principle provided by exemplary embodiments of the present disclosure.

Referring to FIG. 7, FIG. 7 illustrates a schematic of phase detection principle provided by exemplary embodiments of the present disclosure. As shown in FIG. 7, the first phase sensor 121 and the first light-blocking strip 504 may be disposed on the first gear 502. The first phase sensor 121 may be disposed with a transmitter and a receiver. As the first gear 502 rotates, the first light-blocking strip 504 may be between or not between the transmitter and the receiver. When the first light-blocking strip 504 is located between the transmitter and the receiver, the receiver cannot receive the signal transmitted by the transmitter, and the first phase sensor 121 may output a signal (for example, a low-level signal). When the first light-blocking strip 504 is not between the transmitter and the receiver, the receiver may receive the signal transmitted by the transmitter, and the first phase sensor 121 may output another signal (e.g., a high level signal). According to such principle, the phase of the first gear 502 may be detected, that is, the phase of the first photosensitive part may be detected. In order to facilitate the distinction, the phase of the first photosensitive part is referred to "the first rotation phase". In addition, it may also be configured that when the receiver receives light that is not blocked by the first light-blocking strip 504, the first phase sensor 121 may output a low level signal. In contrast, when the first light-blocking strip 504 blocks light and the receiver does not receive the light, the first phase sensor 121 may output a high level signal. In such way, when the first photosensitive part rotates through one revolution, the pulse signal may be outputted once, such that the rotation phase of the first photosensitive part may be detected.

The second phase sensor may be configured to detect the second rotation phase of the second photosensitive part.

In an optional implementation, the second photosensitive parts may include the yellow photosensitive part, the magenta photosensitive part and the cyan photosensitive part. Therefore, the phase of the second photosensitive parts may be detected, that is, the phases of the yellow photosensitive part, the magenta photosensitive part, and the cyan photosensitive part may be detected.

Referring to FIG. 6, in an implementation, the second gears 602*a*-602*c* corresponding to the yellow photosensitive part, the magenta photosensitive part and the cyan photosensitive part among the second photosensitive parts may be all driven by the second motor 112, and the phases of the second gears 602*a*-602*c* may be always matched, such that only one of the second gears 602*a*-602*c* may need to be phase matched. For example, as shown in FIG. 6, the second phase sensor 122 and the second light-blocking strip may be disposed on the second gear 602*a*. Therefore, the phase of the second gear 602*a* may be detected in real time through the second phase sensor 122, that is, the phase of the second photosensitive part may be detected. For ease of distinction, the phase of the second photosensitive part is referred to as "the second rotation phase."

Obviously, in some optional implementations, the phase of the second gear 602*b* or the second gear 602*c* may also be detected; or the phases of the second gears 602*a*-602*c* may be detected respectively to obtain the second rotation phase, which may not be limited in embodiments of the present disclosure.

When the first photosensitive part is at a preset rotation angle, the first phase sensor 121 may output a pulse signal. When the second photosensitive part is at a preset rotation angle, the second phase sensor 122 may output a pulse signal. Therefore, if the time point at which the pulse signal of the first phase sensor 121 decreases is same as the time point at which the pulse signal of the second phase sensor 122 decreases, the phase of the first photosensitive part may be same as the phase of the second photosensitive part. In addition, it may also be determined whether the phase of the first photosensitive part and the phase of the second photosensitive part are same by determining whether the time point at which the pulse signal of the first phase sensor 121 increases and the time point at which the pulse signal of the second phase sensor 122 increases are same. If it is detected that the time point to decrease or the time point to increase of two photosensitive parts are inconsistent, it indicates that the phases of the first photosensitive part and the second photosensitive part may not be matched with a phase difference, and the phase match may need to be performed.

The control unit may be configured to perform the phase match on the first photosensitive part and the second photosensitive part according to the first rotation phase and the second rotation phase.

In one optional implementation, in order to avoid increasing the output time of the first page of image-forming job during the phase match, after at least one page of image-forming job is completed and at least one of the first motor and the second motor receives the phase match instruction, the phase match may be performed on the first photosensitive part and the second photosensitive part according to the rotation phases of the photosensitive parts corresponding to the motor that received the phase match instruction, and the phase match may be performed after completing the first page or multiple pages of image-forming job, which may avoid the situation in the existing technology that performing the phase match before executing the image-forming job may increase the output time of the first page of image-forming job and affect the user experience. In an optional implementation, when the first phase sensor detects the first preset phase signal, the first motor may be controlled to delay for a first fixed time and then stop; and when the second phase sensor detects the second preset phase signal, the second motor to delay may be controlled for a second fixed time and then stop. After the first motor and the second motor are stopped, the phase difference between the first photosensitive part and the second photosensitive part may be less than or equal to a preset phase difference threshold.

Figure 8:
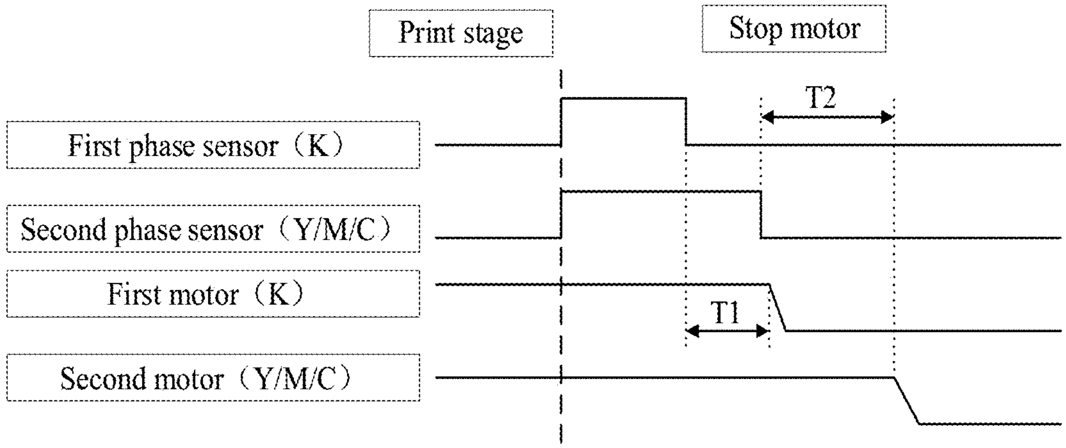
FIG. 8 illustrates a phase match sequence diagram provided by exemplary embodiments of the present disclosure.

Referring to FIG. 8, FIG. 8 illustrates a phase match sequence diagram provided By exemplary embodiments of the present disclosure. In the sequence diagram, the first phase sensor may be at a high level when being not blocked by the first light-blocking strip, and at a low level when being blocked by the first light-blocking strip; and the second phase sensor may be at a high level when being not blocked by the second light-blocking strip, and at a low level when being blocked by the second light-blocking strip.

When the first phase sensor detects the falling edge (i.e., the first phase signal), after delaying the first fixed time T1, the first motor may be controlled to stop rotation; and/or after the second phase sensor detects the falling edge (i.e., the second phase signal), after delaying the second fixed time T2, the second motor may be controlled to stop rotation. The installation positions of the first phase sensor and the second phase sensor are different, and the loads of the first motor and the second motor are different. Therefore, specific values of the first fixed time T1 and the second fixed time T2 may need to be obtained through actual test, and the values of T1 and T2 may be both relatively fixed values. In addition, the delay time of the first motor and the second motor may also be controlled by detecting the rising edges. When the first phase sensor detects the rising edge (i.e., the first phase signal), after delaying the first fixed time T1, the first motor may be controlled to stop rotation; and/or after the second phase sensor detects the rising edge (e.g., the second phase signal), after delaying the second fixed time T2, the second motor may be controlled to stop rotation. According to such control manner, by keeping the absolute value of the difference between the first fixed time and the second fixed time as a fixed value that meets actual need, after the first motor and the second motor are stopped, the phase difference between the first photosensitive part and the second photosensitive part may be less than or equal to the preset phase difference threshold. In other words, after stopping rotation, both the first photosensitive part and the second photosensitive part may stop at the preset phase and be in a phase match state. There is no need to control the acceleration or deceleration of two motors when the first motor and the second motor are restarted at a preset speed. Keeping the startup speed at a preset speed may keep the phases of the first photosensitive part and the second photosensitive part to be matched, that is, the photosensitive parts of four colors may be all matched without the need to perform the phase match again, which may not increase the output time of at least one page of image-forming job in the to-be-printed-job, thereby improving user experience. It should be understood that the match may be performed after the first page of image-forming job is completed, or the match may be performed after the multi-page of image-forming job is completed, which may not be limited in the present disclosure.

Figure 9:
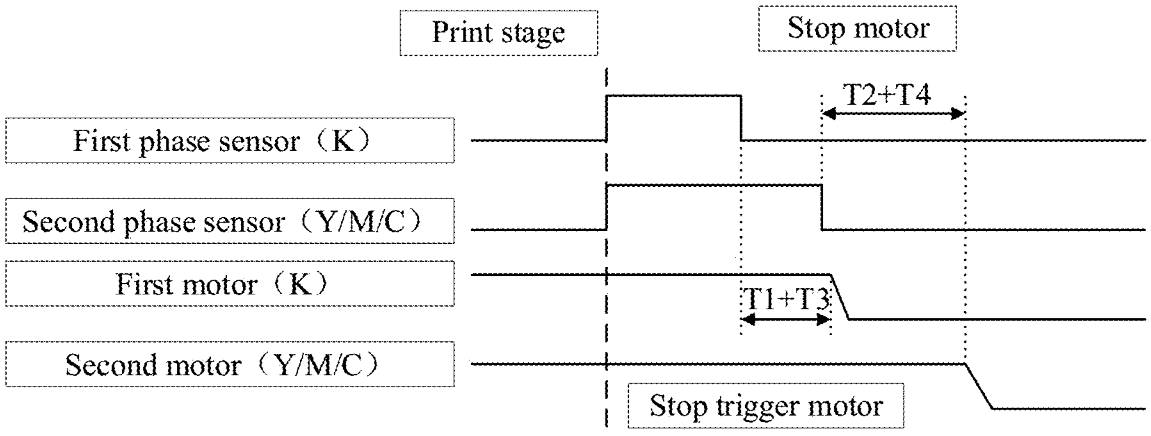
FIG. 9 illustrates another phase match sequence diagram provided by exemplary embodiments of the present disclosure.

Referring to FIG. 9, FIG. 9 illustrates another phase match sequence diagram provided by exemplary embodiments of the present disclosure. In such sequence diagram, the first phase sensor may be at a high level when being not blocked by the first light-blocking strip, and at a low level when being blocked by the first light-blocking strip; and the second phase sensor may be at a high level when being not blocked by the second light-blocking strip, and the second phase sensor may be a low level when being blocked by the second light-blocking strip.

In the phase match sequence of FIG. 8, when the first phase sensor detects the falling edge (i.e., the first phase signal), after delaying the first fixed time T1, the first motor may be controlled to stop rotation; and/or when the second phase sensor detects the falling edge (i.e., the second phase signal), after delaying the second fixed time T2, the second motor may be controlled to stop rotation. The values of T1 and T2 may be both relatively fixed values. If a relatively fixed value is configured to control the delay and stop of the first motor and the second motor, it may cause the first photosensitive part and the second photosensitive part to stop at same phase after each match. Therefore, the position where the photosensitive part is in contact with the transferring belt when the photosensitive part stops every time may be same position on the photosensitive part. Since there is one time pressing down/lifting up operation of the transferring roller when printing starts and ends, the limiting block of the transferring roller may collide same position of the photosensitive part every time, which may result in dirt and damage to the photosensitive part. In order to solve such problem, in the phase match sequence of FIG. 9, when the first phase sensor detects the falling edge (i.e., the first phase signal), after delaying a first variable time, the first motor may be controlled to stop rotation; and/or when the second phase sensor detects the falling edge (i.e., the second phase signal), after delaying a second variable time, the second motor may be controlled to stop rotation. After the first motor and the second motor stop rotation, the phase difference between the first photosensitive part and the second photosensitive part may be less than or equal to the preset phase difference threshold.

After completing previous phase match operation for the first photosensitive part and the second photosensitive part and after at least one of the first motor and the second motor receives the phase match instruction, when a first preset condition is satisfied, new first variable time and/or new second variable time may be configured to perform the phase match on the first photosensitive part and the second photosensitive part. The new first variable time may be different from the first variable time corresponding to previous phase match operation, and the new second variable time may be different from the second variable time corresponding to previous phase match operation. That is, the first variable time and second variable time finally generated may change accordingly.

The first preset condition may be at least one of completion of preheating of the image-forming apparatus, completion of the color print job, completion of color correction (density correction and color mismatch correction of four colors of C/M/Y/K). It can be understood that the first preset condition may also be other conditions that implement the solution in one embodiment, which may be limited in the present disclosure.

After completing previous phase match operation for the first photosensitive part and the second photosensitive part and after at least one of the first motor and the second motor receives the phase match instruction, when the second preset condition is satisfied, the first variable time and/or the second variable time corresponding to previous phase match operation may be configured to perform the phase match on the first photosensitive part and the second photosensitive part. That is, the first variable time and second variable time finally generated may not change.

The second preset condition may include one of after completion of the black-and-white print job, after completion of the density correction corresponding to the black-and-white printing operation (the color mismatch correction of the four colors C/M/Y/K is not performed, only the density correction is performed), and after completion of independent preheating of the black image-forming part (the independent preheating of the black image-forming part refers to the rotation of the developing roller, the photosensitive part and other image-forming parts for printing preparation). It can be understood that the second preset condition may also be other conditions that implement the solution in one embodiment, which may be limited in the present disclosure.

Since only the first motor (K) is stopped for the black-and-white printing and the second motor (Y/M/C) is not started, the phases of these two motors may not change. The first motor may ensure that the phases of these two motors are matched by only using the delay time generated at previous time. In addition, if the second motor (Y/M/C) receives an instruction for instructing the second motor to stop, the first variable time and the second variable time generated at previous time or new first variable time and new second variable time may be used, because the first motor (K) keeps rotating when the color printing is converted to the black-and-white printing. After the motor delay time of the second motor (Y/M/C) is changed, the phases of the first motor (K) and the second motor (Y/M/C) may be matched when the first motor and second motor stop.

In addition, the first variable time used at the first print speed (i.e., normal speed printing) may be less than the first variable time used at the second print speed (i.e., reduced speed printing). Similarly, the first print speed and second print speed may also be configured to be different, and different variable times may be configured according to different print speeds.

It can be understood that actual values of the first variable time and the second variable time mentioned above may be obtained according to actual test, and the set adjustable values may be also generated by actual test.

By controlling the first motor and the second motor to stop after delaying a variable time, it ensures that the phase difference between the first photosensitive part and the second photosensitive part may be less than or equal to the preset phase difference threshold. In such way, the first motor and the second motor may stop at different phases each time compared to previous phase match, and the position where the photosensitive part is in contact with the transferring belt when the photosensitive part stops every time may be different on the photosensitive part. In such way, it may reduce the problem that the limiting block of the transferring roller may collide same position of the photosensitive part every time since there is one time pressing down/lifting up operation of the transferring roller when printing starts and ends which may result in dirt and damage to the photosensitive part.

Above-mentioned phase match of the first photosensitive part and the second photosensitive part may be performed when the first motor and the second motor need to be stopped such as preheating of the image-forming apparatus, supplying toner, normal printing, performing density correction corresponding to color/black-and-white printing operations and the like, which may ensure that the phases of the first photosensitive part and the second photosensitive part are matched to prevent color mismatch. It should be noted that that when paper jam occurs, the photosensitive part, the transferring belt, and the secondary transferring roller may need to be cleaned. Therefore, it needs to apply a cleaning voltage to the secondary transferring roller for cleaning. At this point, since paper jam abnormality occurs, it needs to immediately stop applying the voltage for image-forming to prevent the developer from scattering, which may be inconvenient for phase match. Therefore, phase match may not be performed in the paper jam/cleaning process.

Figure 10:
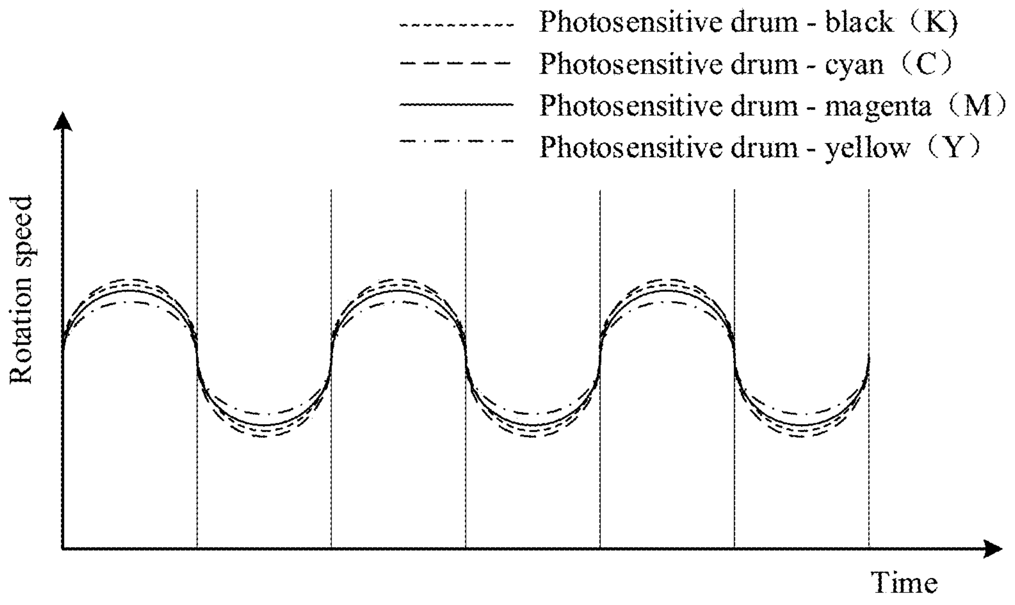
FIG. 10 illustrates another phase diagram of a photosensitive part provided by exemplary embodiments of the present disclosure.

Referring to FIG. 10, FIG. 10 illustrates another phase diagram of a photosensitive part provided by exemplary embodiments of the present disclosure. As shown in FIG. 10, after the phase match is completed according to above manner, the phases of the photosensitive parts of the four colors may remain consistent.

After the first motor and the second motor in embodiments of the present disclosure complete all current print jobs (for example, there are current two jobs to be printed, after two jobs to be printed are completed, that is, after the printing sequence ends), the phase match process may be performed. An instruction for instructing at least one of two motors to enter the phase match may be sent, and the phases of the first motor and the second motor may be detected through the first phase sensor and the second phase sensor, respectively. When the first phase sensor detects the falling edge (i.e., the first phase signal) and the second phase sensor detects the falling edge (i.e., the second phase signal), timing may be started. It can be understood that when the first phase sensor detects the rising edge (i.e., the first phase signal) and the second phase sensor detects the rising edge (i.e., the second phase signal), timing may be started. The time range of timing may be the first fixed time of the first motor timing and the second fixed time of the second motor timing; or the first variable time of the first motor timing and the second variable time of the second motor timing. When the timing reaches a preset time range, the instruction to control stopping of the first motor and the second motor may be sent to complete the phase match of these two motors, which may be, for example, any application scenario that requires the motor to stop according to the stop logic, such as after the image-forming job is completed, after power-on/warm-up, after correction and the like.

In another optional implementation, in order to avoid increasing the output time of the first page of image-forming job during the phase match, after completing the first page or multiple pages of image-forming job, the phase match may be performed on the first photosensitive part and the second photosensitive part according to the first rotation phase and the second rotation phase.

In an implementation, after executing at least one page of image-forming job of the to-be-printed-job (i.e., the job to be printed), the phase difference between the first photosensitive part and the second photosensitive part may be determined according to the first rotation phase and the second rotation phase. The rotation speed of the first motor and/or the second motor may be adjusted according to the phase difference between the first photosensitive part and the second photosensitive part, such that the phase difference between the first photosensitive part and the second photosensitive part may be less than or equal to the preset phase difference threshold. For example, after the first page of image-forming job is completed, that is, after a paper detection sensor (not shown) detects that the tail of the first page passes through the sensor, the matching may be triggered to detect phases. That is, two phase sensors may start to detect the rotation phases of the first motor and the second motor, respectively. The time difference corresponding to the phase difference of two motors may be calculated according to the time points when two phase sensors detect the light-blocking strips, and the rotation speeds of two motors may be adjusted according to the time difference and the preset time difference, such that detected time difference corresponding to the phase difference between two motors next time may be within an error tolerance range, which may indicate that the phases of two motors have been matched. Or after two or more pages of image-forming job are completed, that is, after the paper detection sensor detects that the tail of the second page or more passes through the sensor, the matching may need to be triggered to detect phases, and the phase match may need to be performed.

Figure 11:
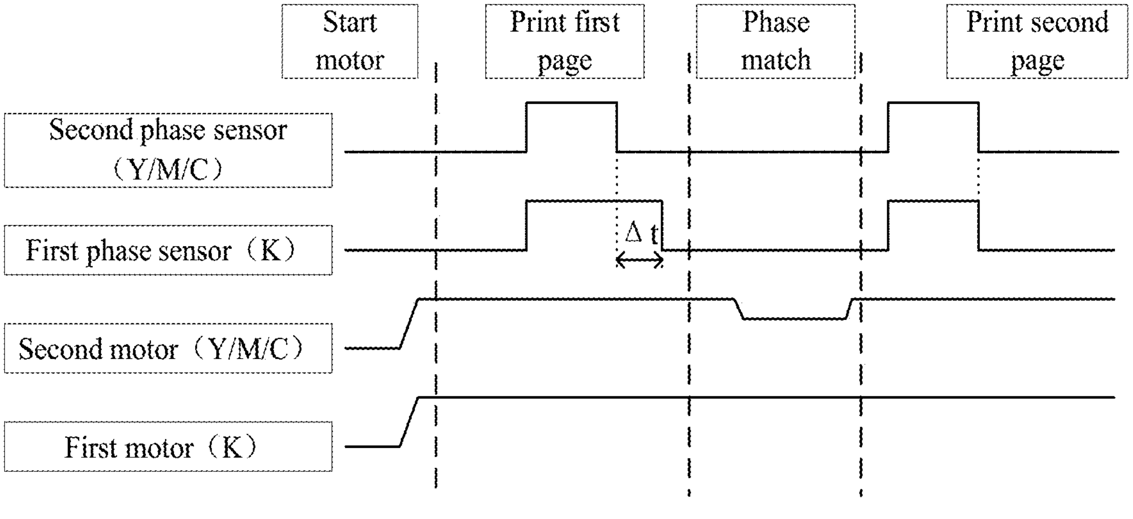
FIG. 11 illustrates another phase match sequence diagram provided by exemplary embodiments of the present disclosure.

Referring to FIG. 11, FIG. 11 illustrates another phase match sequence diagram provided by exemplary embodiments of the present disclosure. As shown in FIG. 11, during a motor starting stage, the first motor and the second motor may start according to normal starting logic and reach a reference rotation speed; when the first page is printed, the image-forming apparatus may detect the phase difference Δt between the first photosensitive part and the second photosensitive part through the first phase sensor and the second phase sensor; after the first page or multiple pages are printed, the rotation speed of the first motor and/or the second motor may be adjusted according to the phase difference Δt, such that the phase difference between the first photosensitive part and the second photosensitive part may be less than or equal to the preset phase difference threshold, that is, the phase match may be completed; and after the phase match is completed, the first motor and the second motor may return to the reference rotation speed and start printing the second page.

In embodiments of the present disclosure, since the phase match is performed after the first page or multiple pages of image-forming job is completed, the output time of the first page or multiple pages of image-forming job may not be increased, and the user experience may be improved.

In an implementation, the rotation speeds of the first motor and/or the second motor may be adjusted according to the phase difference between the first photosensitive part and the second photosensitive part, such that the phase difference between the first photosensitive part and the second photosensitive part may be less than or equal to the preset phase difference threshold, which may include following three speed adjustment manners.

The time for the phase match of two motors may be after the first page of the job is printed, and the phase match instruction may be sent for the phase match. At this point, the phase detection may be performed during the printing process of the first page of the job, or the match may be performed during subsequent printing processes after multiple pages of the job are printed, which may not be limited in the present disclosure.

For the first speed adjustment manner, the first motor may be controlled to maintain the reference rotation speed, and the rotation speed of the second motor may be adjusted, such that the phase difference between the first photosensitive part and the second photosensitive part may be less than or equal to the preset phase difference threshold; and the rotation speed of the second motor may be restored to the reference rotation speed, that is, the scenario shown in FIG. 11.

For the second speed adjustment manner, the second motor may be controlled to maintain the reference rotation speed, and the rotation speed of the first motor may be adjusted, such that the phase difference between the first photosensitive part and the second photosensitive part may be less than or equal to the preset phase difference threshold; and the rotation speed of the first motor may be restored to the reference rotation speed.

For the third speed adjustment manner, the rotation speeds of the first motor and the second motor may be simultaneously adjusted, such that the phase difference between the first photosensitive part and the second photosensitive part may be less than or equal to the preset phase difference threshold; and the rotation speeds of both the first motor and the second motor may be restored to the reference rotation speed.

Figure 12:
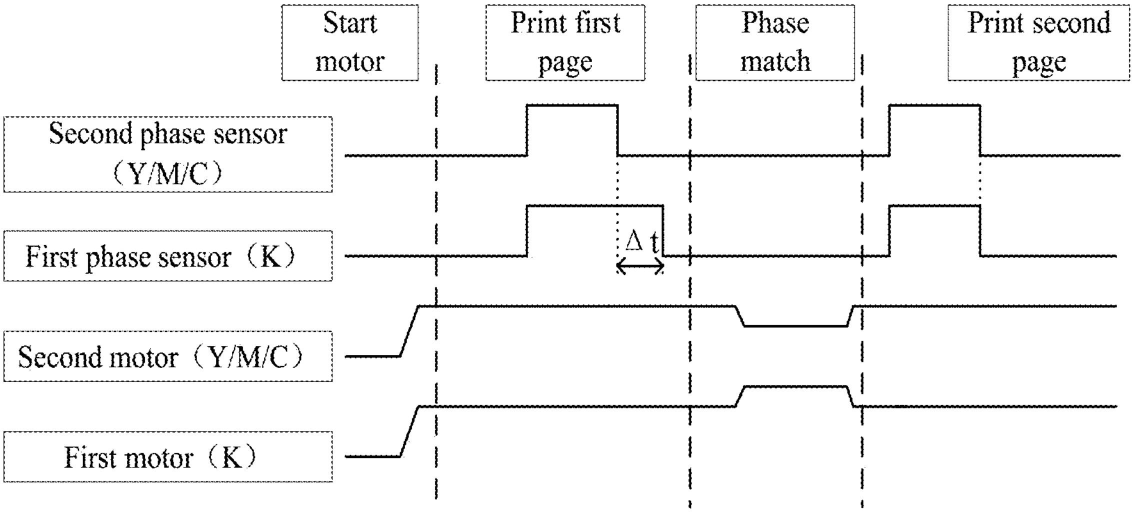
FIG. 12 illustrates another phase match sequence diagram provided by exemplary embodiments of the present disclosure.

Referring to FIG. 12, FIG. 12 illustrates another phase match sequence diagram provided by exemplary embodiments of the present disclosure. As shown in FIG. 12, after completing the phase detection, the rotation speed of the first motor may be increased and the rotation speed of the second motor may be reduced simultaneously, such that the phase difference between the first photosensitive part and the second photosensitive part may be less than or equal to the preset phase difference threshold. It can be understood that by adjusting the first motor and the second motor simultaneously in such implementation, the phase match time may be shortened. Obviously, in other application scenarios, the rotation speed of the first motor may also be reduced and the rotation speed of the second motor may be increased, which may not be limited in embodiments of the present disclosure.

In an optional implementation, the control unit may be further configured to, when the first motor and the second motor are started, successively control the first motor and the second motor to start at different times. Normally, the load generated in the circuit may be relatively large when the motor is started. Starting the first motor and the second motor successively may reduce the load of the image-forming apparatus.

As disclosed above, in above-mentioned embodiments, after completing at least one page of image-forming job and at least one of the first motor and the second motor receives the phase match instruction, the rotation phase of the photosensitive part corresponding to the motor receiving the phase match instruction may perform the phase match on the first photosensitive part and the second photosensitive part. However, in practical applications, after the motor speed is stabilized and the process of the image-forming job is performed for a long time, there may still be a problem of the phase difference between different photosensitive parts. Therefore, according to above-mentioned embodiments, the present disclosure may also perform the phase match operation according to the phase difference of different photosensitive parts after the motor speed is stabilized. For example, after the motor speed is stabilized, the first rotation phase of the first photosensitive part and the second rotation phase of the second photosensitive part may be detected in real time. If the phase difference between the first rotation phase and the second rotation phase is greater than or equal to the preset phase difference threshold, the phase match may be performed. Detailed description of such process is provided below with reference to various embodiments of the present disclosure.

Figure 13:
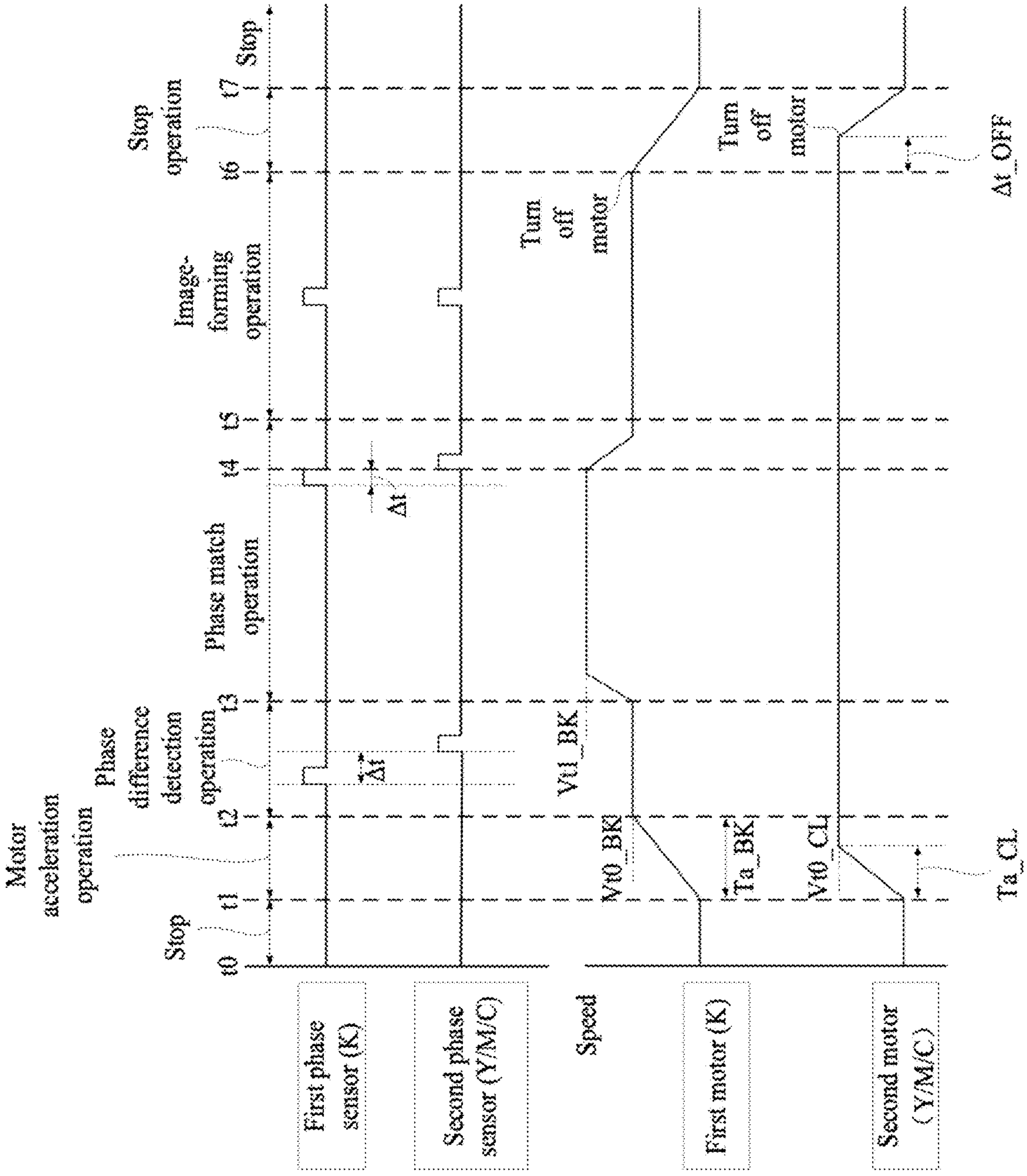
FIG. 13 illustrates another phase match sequence diagram provided by exemplary embodiments of the present disclosure.

Referring to FIG. 13, FIG. 13 illustrates another phase match sequence diagram provided by exemplary embodiments of the present disclosure. As shown in FIG. 13, the sequence diagram portion of the second phase sensor and the first phase sensor may respectively show the pulse signals outputted by each rotation of the second photosensitive part and the first photosensitive part. In contrast, the sequence diagram portion of the second motor and the first motor may show the rotation speeds of the second motor and the first motor, respectively.

At time t0, the first photosensitive part and the second photosensitive part may be stationary while maintaining a preset phase relationship. At time t1, the first motor and the second motor may start driving simultaneously. The second motor may be accelerated to the rotation speed of Vt0_CL required for image formation. The first motor may be accelerated to the rotation speed of Vt0_BK required for image formation. When the diameters of the second photosensitive part and the first photosensitive part are same, and if the gear ratio of the second motor to each gear of the second photosensitive part and the gear ratio of the first motor to the first photosensitive part are same, the rotation speeds Vt0_CL and Vt0_BK may be same. After the time period Ta_CL has elapsed since the second motor starts driving, the rotation speed of the second motor may reach the rotation speed Vt0_CL. In contrast, after the time period Ta_BK has elapsed since the first motor starts driving, the rotation speed of the first motor may reach the rotation speed Vt0_BK. At this point, control may be performed, such that after the second motor and the first motor reach the rotation speeds for image formation, the rotation speeds for image formation may remain unchanged.

Subsequently, at time t2, detecting the difference between the phase of the second photosensitive part and the phase of the first photosensitive part may start. When the second photosensitive part is at a preset rotation angle, the second phase sensor may output a pulse signal. When the first photosensitive part is at a preset rotation angle, the first phase sensor may output a pulse signal. Such configuration may be designed to be that if the rising time point of the pulse signal of the second phase sensor is same as the rising time point of the pulse signal of the first phase sensor, the phase of the second photosensitive part may be same as the phase of the first photosensitive part. FIG. 13 shows that the phase of the first photosensitive part may be detected by the first phase sensor, and such phase may lag behind the phase of the second photosensitive part detected by the second phase sensor by a phase difference Δt.

At time t3, the first motor with a lagging phase may be accelerated to a rotation speed Vt1_BK higher than the rotation speed Vt0_BK. In such way, the lagging phase of the first photosensitive part may catch up with the phase of the second photosensitive part. Subsequently, at time t4, the phase difference Δt between the pulse signals outputted from the second phase sensor and the first phase sensor may become less than or equal to the pre-set value, the rotation speed of the first motor changes back to the rotation speed Vt0_BK. The preset value of the phase difference may be configured to determine the time point at which the first motor rotating at the rotation speed Vt1_BK may start to decelerate. The preset value of the phase difference may be configured to a value that makes the phase of the first photosensitive part to be same as or substantially same as the phase of the second photosensitive part when the first motor decelerates to the rotation speed Vt0_BK, that is, the value that the difference between the phase of the pulse signal of the first phase sensor and the phase of the pulse signal of the second phase sensor may be zero or substantially zero. In such way, the difference between the phase of the second photosensitive part and the phase of the first photosensitive part may be configured to be a value less than or equal to the pre-set value. Subsequently, the image formation may start at time t5 and end at time t6. At time t6, when the image-forming operation ends, the first motor may start to be deceleration. When the time period ΔT_OFF has elapsed from time t6, the second motor may start to be deceleration. The time period ΔT_OFF may be a time difference for simultaneously stopping the second motor and the first motor. At time t7, the second motor and the first motor may stop due to a preset phase relationship therebetween. Similarly, the first motor may also first decelerate and then accelerate to a preset speed to perform the phase match of the four photosensitive parts, which may not be limited in the present disclosure.

Figure 14:
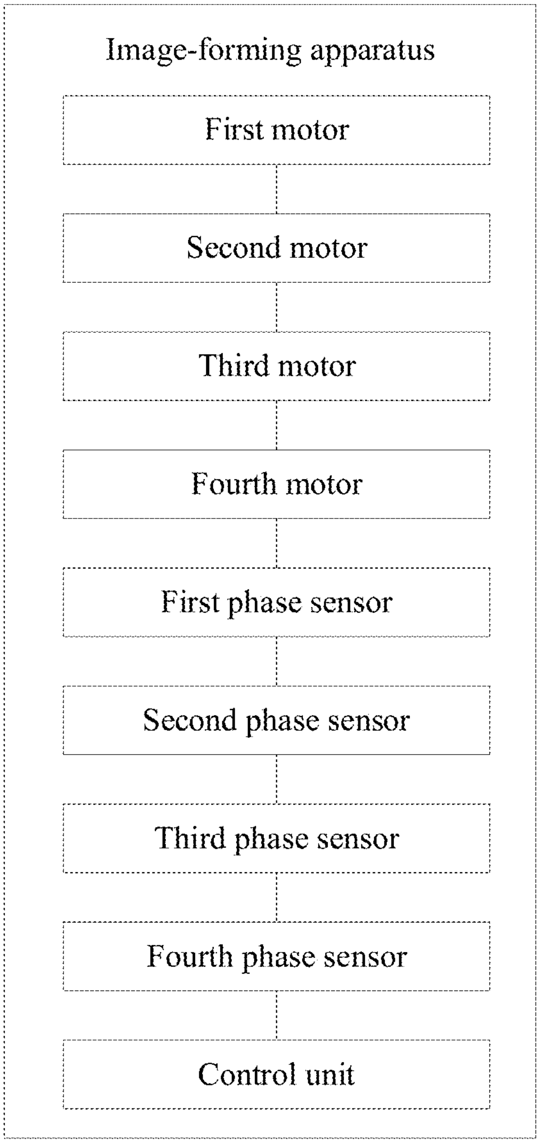
FIG. 14 illustrates another structural block diagram of an image-forming apparatus provided by exemplary embodiments of the present disclosure.

Referring to FIG. 14, FIG. 14 illustrates a structural block diagram of an image-forming apparatus provided by exemplary embodiments of the present disclosure. As shown in FIG. 14, the image-forming apparatus may mainly include following functional units: the first motor configured to rotate the first photosensitive part; the second motor configured to rotate the second photosensitive part; the third motor configured to rotate the third photosensitive part; the fourth motor configured to rotate the fourth photosensitive part; the first phase sensor configured to detect the first rotation phase of the first photosensitive part; the second phase sensor configured to detect the second rotation phase of the second photosensitive part; the third phase sensor configured to detect the third rotation phase of the third photosensitive part; the fourth phase sensor configured to detect the fourth rotation phase of the fourth photosensitive part; and the control unit is configured to, after completing at least one page of image-forming job and after at least one of the first motor, the second motor, the third motor, and the fourth motor receives the phase match instruction, to perform the phase match on the first photosensitive part, the second photosensitive part, the third photosensitive part, and the fourth photosensitive part according to the rotation phase of the photosensitive part corresponding to the motor that receives the phase match instruction. The phase match instruction may be configured to instruct the first photosensitive part, the second photosensitive part, the third photosensitive part, and the fourth photosensitive part to perform the phase match according to actual need.

The difference between the image-forming apparatus and the image-forming apparatus shown in FIG. 4 is that each of four photosensitive parts may be driven by an independent motor. Since four photosensitive parts are relatively independent, the phases of four photosensitive parts may need to be detected by phase sensors respectively. When the phase match is performed, four photosensitive parts may need to be matched sequentially.

For ease of understanding, in an implementation, "after completing at least one page of image-forming job and after at least one of the first motor, the second motor, the third motor, and the fourth motor receives the phase match instruction, performing the phase match on the first photosensitive part, the second photosensitive part, the third photosensitive part, and the fourth photosensitive part according to the rotation phase of the photosensitive part corresponding to the motor that receives the phase match instruction" is described hereinafter.

Figure 15:
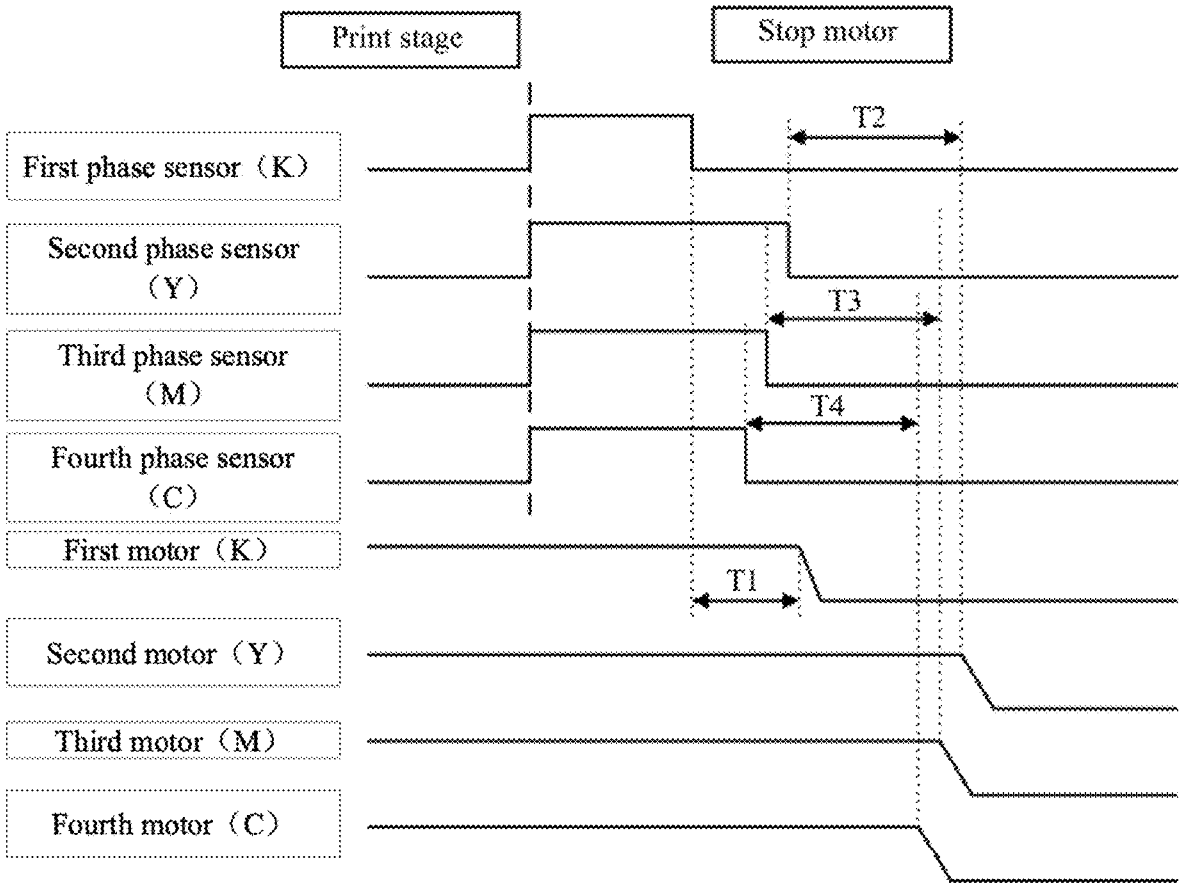
FIG. 15 illustrates another phase match sequence diagram provided by exemplary embodiments of the present disclosure.

Referring to FIG. 15, FIG. 15 illustrates another phase match sequence diagram provided by exemplary embodiments of the present disclosure. In such sequence diagram, the first phase sensor may be at a high level when being not blocked by the first light-blocking strip and at a low level when being blocked by the first light-blocking strip; the second phase sensor may be at a high level when being not blocked by the second light-blocking strip and at a low level when being blocked by the second light-blocking strip; the third phase sensor may be at a high level when being not blocked by the third light-blocking strip and at a low level when being blocked by the third light-blocking strip; and the fourth phase sensor may be at a high level when being not blocked by the fourth light-blocking strip and at a low level when being blocked by the fourth light-blocking strip.

When the first phase sensor detects the falling edge, after delaying the first fixed time T1, the first motor may be controlled to stop rotation; when the second phase sensor detects the falling edge, after delaying the second fixed time T2, the second motor may be controlled to stop rotation; when the third phase sensor detects the falling edge, after delaying the third fixed time T3, the third motor may be controlled to stop rotation; and when the fourth phase sensor detects the falling edge, after delaying the fourth fixed time T4, the fourth motor may be controlled to stop rotation. It can be understood that at least one or more of the first motor, the second motor, the third motor and the fourth motor may also be controlled to stop rotation after delaying a fixed time. The installation positions of the first phase sensor, the second phase sensor, the third phase sensor and the fourth phase sensor are different, and the loads of the first motor, the second motor, the third motor and the fourth motor are different, such that specific values of the first fixed time T1, the second fixed time T2, the third fixed time T3 and the fourth fixed time T4 may need to be obtained through actual test. According to such control manner, after the first motor, the second motor, the third motor and the fourth motor stop, the phase difference between any two of the first photosensitive part, the second photosensitive part, the third photosensitive part and the fourth photosensitive part may be less than or equal to the preset phase difference threshold. In other words, after stopping, the first photosensitive part, the second photosensitive part, the third photosensitive part and the fourth photosensitive part may all stop at the preset phases and be in the phase match state. When the first motor, the second motor, the third motor and the fourth motor are restarted, the phases of the first photosensitive part, the second photosensitive part, the third photosensitive part and the fourth photosensitive part may be matched, that is, the photosensitive parts of the four colors may be all matched; and there is no need to perform the phase match again, which may not increase the output time of the first page or multiple pages of image-forming job and may improve the user experience.

It can be understood that respective delay times of the first motor, the second motor, the third motor, and the fourth motor may also be configured to be the first variable time, the second variable time, the third variable time, and the fourth variable time. That is, when the first phase sensor detects the falling edge, after delaying the first variable time, the first motor may be controlled to stop rotation; when the second phase sensor detects the falling edge, after delaying the second variable time, the second motor may be controlled to stop rotation; when the third phase sensor detects the falling edge, after delaying the third variable time, the third motor may be controlled to stop rotation; and when the fourth phase sensor detects the falling edge, after delaying the fourth variable time, the fourth motor may be controlled to stop rotation. It can be understood that at least one or more of the first motor, the second motor, the third motor and the fourth motor may also be controlled to stop rotation after delaying a variable time. After the first motor, the second motor, the third motor and the fourth motor stop, the phase difference between the first photosensitive part, the second photosensitive part, the third photosensitive part and the fourth photosensitive part may be less than or equal to the preset phase difference threshold. In such way, it may reduce the problem that the limiting block of the transferring roller may collide same position of the photosensitive part every time since there is one time pressing down/lifting up operation of the transferring roller when printing starts and ends which may result in dirt and damage to the photosensitive part. The configuration scheme of the first variable time, the second variable time, the third variable time, and the fourth variable time may refer to the description of embodiment shown in FIG. 9, which may not be described in detail herein for simplicity.

Specific contents related to embodiments of the present disclosure may refer to the description of embodiment shown in FIG. 4, which may not be described in detail herein for simplicity.

Corresponding to above-mentioned embodiments, embodiments of the present disclosure further provide a phase match method for the photosensitive parts.

Figure 16:
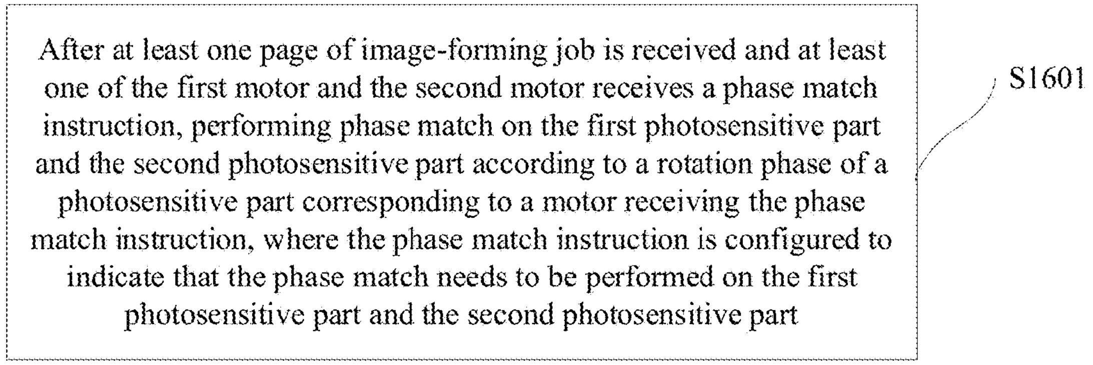
FIG. 16 illustrates a flowchart of a phase match method of photosensitive parts provided by exemplary embodiments of the present disclosure.

Referring to FIG. 16, FIG. 16 illustrates a flowchart of a phase match method of photosensitive parts provided by exemplary embodiments of the present disclosure. Such method may be applied to the image-forming apparatus shown in FIG. 4. As shown in FIG. 16, the phase match method may mainly include following exemplary steps.

At S1601, after completing at least one page of image-forming job and after at least one of the first motor and the second motor receives the phase match instruction, the phase match may be performed on the first photosensitive part and the second photosensitive part according to the rotation phase of the photosensitive part corresponding to the motor that received the phase match instruction. The phase match instruction may be configured to instruct the first photosensitive part and the second photosensitive part to perform the phase match.

In an optional implementation, S1601 may exemplarily include, when the first phase sensor detects the first preset phase signal, controlling the first motor to stop rotation after delaying the first fixed time; and/or when the second phase sensor detects the second preset phase signal, controlling the second motor to stop rotation after delaying the second fixed time. After both the first motor and the second motor stop rotation, the phase difference between the first photosensitive part and the second photosensitive part may be less than or equal to the preset phase difference threshold.

It can be understood that respective delay times of the first motor and the second motor may also be configured as the first variable time and the second variable time; when the first phase sensor detects the first preset phase signal, the first motor may be controlled to delay the first variable time and then stop rotation; and when the second phase sensor detects the second preset phase signal, the second motor may be controlled to delay the second variable time and then stop rotation. After the first motor and the second motor are stopped, the phase difference between the first photosensitive part and the second photosensitive part may be less than or equal to the preset phase difference threshold. In such way, it may reduce the problem that the limiting block of the transferring roller may collide same position of the photosensitive part every time since there is one time pressing down/lifting up operation of the transferring roller when printing starts and ends which may result in dirt and damage to the photosensitive part. The configuration scheme of the first variable time and the second variable time may refer to the description of embodiment shown in FIG. 9, which may not be described in detail herein for simplicity.

Figure 17:
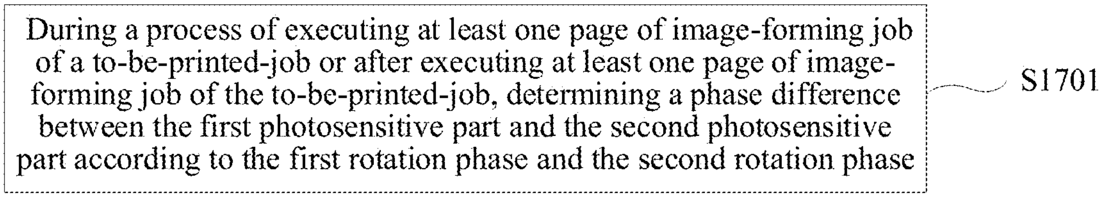
FIG. 17 illustrates another flowchart of a phase match method of photosensitive parts provided by exemplary embodiments of the present disclosure.

Referring to FIG. 17, FIG. 17 illustrates another flowchart of a phase match method of photosensitive parts provided by exemplary embodiments of the present disclosure. Such method may be applied to the image-forming apparatus shown in FIG. 4. As shown in FIG. 17, the phase match method may mainly include following exemplary steps.

At S1701, during the process of executing at least one page of the image-forming job in the to-be-printed-job or after executing at least one page of the image-forming job in the to-be-printed-job, the phase difference between the first photosensitive part and the second photosensitive part may be determined according to the first rotation phase and the second rotation phase.

In an optional implementation, S1701 may exemplarily include, during the process of executing at least one page of image-forming jobs in the to-be-printed-job or after executing at least one page of image-forming jobs in the to-be-printed-job, determining the phase difference between the first photosensitive part and the second photosensitive part according to the first rotation phase and the second rotation phase; and adjusting the rotation speeds of the first motor and/or the second motor according to the phase difference between the first photosensitive part and the second photosensitive part, such that the phase difference between the first photosensitive part and the second photosensitive part may be less than or equal to the preset phase difference threshold.

In an optional implementation, adjusting the rotation speeds of the first motor and/or the second motor according to the phase difference between the first photosensitive part and the second photosensitive part to make that the phase difference between the first photosensitive part and the second photosensitive part is less than or equal to the preset phase difference threshold may include the following. The first motor may be controlled to maintain the reference rotation speed, and the rotation speed of the second motor may be adjusted, such that the phase difference between the first photosensitive part and the second photosensitive part may be less than or equal to the preset phase difference threshold; or the second motor may be controlled to maintain the reference rotation speed and the rotation speed of the first motor may be adjusted, such that the phase difference between the first photosensitive part and the second photosensitive part may be less than or equal to the preset phase difference threshold; and the rotation speeds of the first motor and the second motor may be adjusted simultaneously, such that the phase difference between the first photosensitive part and the second photosensitive part may be less than or equal to the preset phase difference threshold.

In an optional implementation, based on the methods shown in FIG. 16 and FIG. 17, the method may further include, when the first motor and the second motor are started, successively controlling the first motor and the second motor to start at different times.

In an optional implementation, in the methods shown in FIG. 16 and FIG. 17, the first photosensitive parts may include the black photosensitive part; the second photosensitive parts may include the yellow photosensitive part, the magenta photosensitive part, and the cyan photosensitive part.

In embodiments of the present disclosure, after at least one page of image-forming job is completed and after at least one of the first motor and the second motor receives the phase match instruction, the phase match may be performed on the first photosensitive part and the second photosensitive part according to the rotation phase of the photosensitive part corresponding to the motor that received the phase match instruction, which may not increase the output time of the first page or multiple pages of image-forming job and improve the user experience. It should be noted that that specific contents of such method embodiment may refer to the description of embodiments of the image-forming apparatus in FIG. 4, which may not be described in detail herein for simplicity.

Corresponding to the above embodiments, embodiments of the present disclosure further provide another phase match method for the photosensitive parts. Such method may be applied to the image-forming apparatus shown in FIG. 14 and mainly include following exemplary steps.

After completing at least one page of image-forming job and after at least one of the first motor, the second motor, the third motor, and the fourth motor receives the phase match instruction, the phase match may be performed on the first photosensitive part, the second photosensitive part, the third photosensitive part, and the fourth photosensitive part according to the rotation phase of the photosensitive part corresponding to the motor that receives the phase match instruction. The phase match instruction may be configured to instruct the first photosensitive part, the second photosensitive part, the third photosensitive part, and the fourth photosensitive part to perform the phase match.

It should be noted that that specific contents of such method may refer to the description of embodiments of the image-forming apparatus in FIG. 14, which may not be described in detail herein for simplicity.

Corresponding to the above embodiments, embodiments of the present disclosure further provide a computer-readable storage medium, where the computer-readable storage medium may store a program. When the program is executed, the device where the computer-readable storage medium is located may be controlled to perform some or all of steps in above-mentioned method embodiments. In an implementation, the computer-readable storage medium may be a magnetic disk, an optical disk, a read-only memory (ROM) or a random access memory (RAM), and/or the like.

Corresponding to above-mentioned embodiments, embodiments of the present disclosure further provide a computer program product. The computer program product may include an executable instruction. When the executable instruction is executed on the computer, the computer may be configured to perform some or all of steps in above-mentioned method embodiments.

In embodiments of the present disclosure, "at least one" refers to one or more; and "plurality" refers to two or more. "And/or" describes the relationship between associated objects, indicating that there may be three relationships. For example, A and/or B may represent A alone, both A and B, or B alone. A and B may be singular or plural. The character "/" indicates that related objects are in an "or" relationship. "At least one of the following items" and similar expressions refer to any combination of these items, including any combination of single or plural items. For example, at least one of a, b and c may represent: a, b, c, a-b, a-c, b-c, or a-b-c, where a, b and c are single or multiple.

Those skilled in the art may realize that each unit and algorithm step described in embodiments disclosed herein may be implemented by an electronic hardware, or a combination of computer software and electronic hardware. Whether these functions are performed in hardware or software depends on specific application and design constraints of technical solutions. Those skilled in the art may implement described functionality using different methods for each specific application, but such implementations should not be considered beyond the scope of the present disclosure.

Those skilled in the art may clearly understand that for the convenience and simplicity of description, specific working processes of the system, device and unit described above may refer to corresponding processes in above-mentioned method embodiments, which not be described in detail herein.

In some embodiments provided in the present disclosure, if any function is implemented in the form of a software functional unit and sold or used as an independent product, it may be stored in a computer-readable storage medium. According to such understanding, essential part of the technical solution of the present disclosure or a part that contributes to the existing technology or a part of the technical solution may be embodied in the form of a software product. The computer software product may be stored in a storage medium and includes multiple instructions to cause a computer device (which may be a personal computer, a server, or a network device or the like) to execute all or part of steps of the methods described in various embodiments of the present disclosure. Above-mentioned storage media may include various media that may store program code including U disk, mobile hard disk, read-only memory (ROM), random access memory (RAM), magnetic disk, optical disk and/or the like.

Compared with the existing technology, the technical solutions provided by the present disclosure may achieve at least the following beneficial effects.

After completing at least one page of image-forming job, after at least one of the first motor and the second motor may receive the phase match instruction, the phase match may be performed on the first photosensitive part and the second photosensitive part according to the rotation phase of the photosensitive part corresponding to the motor that receives the phase match instruction. The phase match may be performed after the first page or multiple pages of image-forming job is completed, which may avoid the situation in the existing technology that performing the phase match before executing the image-forming job may increase the output time of the first page of image-forming job to affect user experience. In the present disclosure, the output time of the first page or multiple pages may be reduced by performing the phase match of two motors after completing at least one page of image-forming job.

In an optional implementation manner, the first motor and/or the second motor may be controlled to delay rotation for the first fixed time and the second fixed time respectively and then stop rotation to perform the phase match of two photosensitive parts; and the phase match may be performed according to the phase match instruction after completing the print job, which may not occupy the time before image-forming job, and may reduce the time for outputting the first page or multiple pages.

The first motor and/or the second motor may be controlled to delay the first variable time and the second variable time respectively and then stop rotation to perform the phase match of two photosensitive parts. Therefore, the first motor and the second motor may stop at different phases each time compared to previous time for performing the phase match. In such way, it may reduce the problem that the limiting block of the transferring roller may collide same position of the photosensitive part every time since there is one time pressing down/lifting up operation of the transferring roller when printing starts and ends which may result in dirt and damage to the photosensitive part.

The above may be only optional embodiments of the present disclosure and may not intended to limit the present disclosure. For those skilled in the art, the present disclosure may have various modifications and changes. Any modifications, equivalent replacements, improvements and the like made within the spirit and principle of the present disclosure shall be included in the protection scope of the present disclosure.

What is claimed is:

1. An image-forming apparatus, comprising:

a first motor, configured to rotate a first photosensitive part;

a second motor, configured to rotate a second photosensitive part;

a first phase sensor, configured to detect a first rotation phase of the first photosensitive part;

a second phase sensor, configured to detect a second rotation phase of the second photosensitive part; and a control unit, configured to, after at least one page of image-forming job is received and at least one of the first motor and the second motor receives a phase match instruction, perform a phase match on the first photosensitive part and the second photosensitive part according to a rotation phase of a photosensitive part corresponding to a motor receiving the phase match instruction, wherein the phase match instruction is configured to indicate that the phase match needs to be performed on the first photosensitive part and the second photosensitive part, wherein the control unit is configured to, when the first phase sensor detects a first preset phase signal, control the first motor to stop rotation after delaying a first variable time; and/or when the second phase sensor detects a second preset phase signal, control the second motor to stop rotation after delaying a second variable time, wherein after both the first motor and the second motor stop rotation, a phase difference between the first photosensitive part and the second photosensitive part is less than or equal to a preset phase difference threshold, and wherein when a print speed of the image-forming apparatus is a first print speed, the control unit is configured to use a third sub-variable time to perform a phase match operation on the first photosensitive part and the second photosensitive part; and when the print speed of the image-forming apparatus is a second print speed, the control unit is configured to use a fourth sub-variable time to perform the phase match operation on the first photosensitive part and the second photosensitive part, wherein when the first print speed is greater than the second print speed, the third sub-variable time is less than the fourth sub-variable time.

2. The image-forming apparatus according to claim 1, wherein:

the control unit is configured to, when the first phase sensor detects the first preset phase signal, control the first motor to stop rotation after delaying a first fixed time; and/or when the second phase sensor detects the second preset phase signal, control the second motor to stop rotation after delaying a second fixed time, wherein after both the first motor and the second motor stop rotation, the phase difference between the first photosensitive part and the second photosensitive part is less than or equal to the preset phase difference threshold.

3. The image-forming apparatus according to claim 1, wherein:

the control unit is configured to, after a previous phase match operation for the first photosensitive part and the second photosensitive part is completed and at least one of the first motor and the second motor receives the phase match instruction, when a first preset condition is satisfied, use a new first variable time and/or a new second variable time to perform the phase match on the first photosensitive part and the second photosensitive part, wherein the new first variable time is different from the first variable time corresponding to the previous phase match operation, and the new second variable time is different from the second variable time corresponding to the previous phase match operation; or the control unit is configured to, after a previous phase match operation for the first photosensitive part and the second photosensitive part is completed and at least one of the first motor and the second motor receives the phase match instruction, when a second preset condition is satisfied, use the first variable time and/or the second variable time corresponding to the previous phase match operation to perform the phase match on the first photosensitive part and the second photosensitive part.

4. The image-forming apparatus according to claim 3, wherein:

the first preset condition includes at least one of completing printing preparation of the image-forming apparatus, after completing a color print job, and after completing color correction; and the second preset condition includes at least one of after completing a black-and-white print job, after completing density correction corresponding to a black-and-white printing operation, and after completing printing preparation of a black image-forming part.

5. The image-forming apparatus according to claim 1, wherein:

the control unit is configured to, after at least one of the first motor and the second motor receives the phase match instruction, and when an initially determined first variable time exceeds a first preset value or an initially determined second variable time exceeds a second preset value, use a new first variable time and/or a new second variable time to perform the phase match on the first photosensitive part and the second photosensitive part, wherein the new first variable time does not exceed the first preset value, and the new second variable time does not exceed the second preset value.

6. The image-forming apparatus according to claim 1, wherein:

the control unit is configured to, after executing at least one page of image-forming job of the to-be-printed-job, determine a phase difference between the first photosensitive part and the second photosensitive part according to the first rotation phase and the second rotation phase; and adjust a rotation speed of the first motor and/or a rotation speed of the second motor according to the phase difference between the first photosensitive part and the second photosensitive part, such that the phase difference between the first photosensitive part and the second photosensitive part is less than or equal to the preset phase difference threshold.

7. The image-forming apparatus according to claim 6, wherein:

the control unit is configured to control the first motor to maintain a reference rotation speed, and adjust the rotation speed of the second motor, such that the phase difference between the first photosensitive part and the second photosensitive part is less than or equal to the preset phase difference threshold; or the control unit is configured to control the second motor to maintain a reference rotation speed, and adjust the rotation speed of the first motor, such that the phase difference between the first photosensitive part and the second photosensitive part is less than or equal to the preset phase difference threshold; or the control unit is configured to adjust the rotation speeds of the first motor and the second motor simultaneously, such that the phase difference between the first photosensitive part and the second photosensitive part is less than or equal to the preset phase difference threshold.

8. The image-forming apparatus according to claim 1, wherein:

the first photosensitive part includes a black photosensitive part; and the second photosensitive part includes at least one of a yellow photosensitive part, a magenta photosensitive part, and a cyan photosensitive part; or the first photosensitive part includes one of a yellow photosensitive part, a magenta photosensitive part and a cyan photosensitive part; and the second photosensitive part includes another one of the yellow photosensitive part, the magenta photosensitive part, and the cyan photosensitive part.

9. A phase match method of photosensitive parts, applied to an image-forming apparatus, wherein the image-forming apparatus includes a first motor, configured to rotate a first photosensitive part; a second motor, configured to rotate a second photosensitive part; a first phase sensor, configured to detect a first rotation phase of the first photosensitive part; a second phase sensor, configured to detect a second rotation phase of the second photosensitive part, the method comprising:

after at least one page of image-forming job is received and at least one of the first motor and the second motor receives a phase match instruction, performing a phase match on the first photosensitive part and the second photosensitive part according to a rotation phase of a photosensitive part corresponding to a motor receiving the phase match instruction, wherein the phase match instruction is configured to indicate that the phase match needs to be performed on the first photosensitive part and the second photosensitive part, wherein, when the first phase sensor detects a first preset phase signal, the method further comprises controlling the first motor to stop rotation after delaying a first variable time; and/or when the second phase sensor detects a second preset phase signal, the method further comprises controlling the second motor to stop rotation after delaying a second variable time, wherein after both the first motor and the second motor stop rotation, a phase difference between the first photosensitive part and the second photosensitive part is less than or equal to a preset phase difference threshold, and wherein when a print speed of the image-forming apparatus is a first print speed, the method further comprises using a third sub-variable time to perform a phase match operation on the first photosensitive part and the second photosensitive part; and when the print speed of the image-forming apparatus is a second print speed, the method further comprises using a fourth sub-variable time to perform the phase match operation on the first photosensitive part and the second photosensitive part, wherein when the first print speed is greater than the second print speed, the third sub-variable time is less than the fourth sub-variable time.

10. The phase match method according to claim 9, wherein after the at least one page of image-forming job is received and the at least one of the first motor and the second motor receives the phase match instruction, performing the phase match on the first photosensitive part and the second photosensitive part according to the rotation phase of the photosensitive part corresponding to the motor receiving the phase match instruction includes:

when the first phase sensor detects the first preset phase signal, controlling the first motor to stop rotation after delaying a first fixed time; and/or when the second phase sensor detects the second preset phase signal, controlling the second motor to stop rotation after delaying a second fixed time, wherein after both the first motor and the second motor stop rotation, the phase difference between the first photosensitive part and the second photosensitive part is less than or equal to the preset phase difference threshold.

11. The phase match method according to claim 9, further including:

after a previous phase match operation for the first photosensitive part and the second photosensitive part is completed and at least one of the first motor and the second motor receives the phase match instruction, when a first preset condition is satisfied, using a new first variable time and/or a new second variable time to perform the phase match on the first photosensitive part and the second photosensitive part, wherein the new first variable time is different from the first variable time corresponding to the previous phase match operation, and the new second variable time is different from the second variable time corresponding to the previous phase match operation; or after a previous phase match operation for the first photosensitive part and the second photosensitive part is completed and at least one of the first motor and the second motor receives the phase match instruction, when a second preset condition is satisfied, using the first variable time and/or the second variable time corresponding to the previous phase match operation to perform the phase match on the first photosensitive part and the second photosensitive part.

12. The phase match method according to claim 9, further including:

after at least one of the first motor and the second motor receives the phase match instruction, and when an initially determined first variable time exceeds a first preset value or an initially determined second variable time exceeds a second preset value, using a new first variable time and/or a new second variable time to perform a phase match operation on the first photosensitive part and the second photosensitive part, wherein the new first variable time does not exceed the first preset value, and the new second variable time does not exceed the second preset value.

13. The phase match method according to claim 9, wherein after the at least one page of image-forming job is received and the at least one of the first motor and the second motor receives the phase match instruction, performing the phase match on the first photosensitive part and the second photosensitive part according to the rotation phase of the photosensitive part corresponding to the motor receiving the phase match instruction includes:

after executing at least one page of image-forming job of the to-be-printed-job, determining the phase difference between the first photosensitive part and the second photosensitive part according to the first rotation phase and the second rotation phase; and adjusting a rotation speed of the first motor and/or a rotation speed of the second motor according to the phase difference between the first photosensitive part and the second photosensitive part to make the phase difference between the first photosensitive part and the second photosensitive part less than or equal to the preset phase difference threshold.

14. The phase match method according to claim 13, wherein adjusting the rotation speed of the first motor and/or the rotation speed of the second motor according to the phase difference between the first photosensitive part and the second photosensitive part to make the phase difference between the first photosensitive part and the second photosensitive part less than or equal to the preset phase difference threshold includes:

controlling the first motor to maintain a reference rotation speed, and adjusting the rotation speed of the second motor, such that the phase difference between the first photosensitive part and the second photosensitive part is less than or equal to the preset phase difference threshold; or controlling the second motor to maintain a reference rotation speed, and adjusting the rotation speed of the first motor, such that the phase difference between the first photosensitive part and the second photosensitive part is less than or equal to the preset phase difference threshold; or adjusting the rotation speeds of the first motor and the second motor simultaneously, such that the phase difference between the first photosensitive part and the second photosensitive part is less than or equal to the preset phase difference threshold.

15. A phase match method of photosensitive parts, applied to an image-forming apparatus, wherein the image-forming apparatus includes a first motor, configured to rotate a first photosensitive part; a second motor, configured to rotate a second photosensitive part; a first phase sensor, configured to detect a first rotation phase of the first photosensitive part; a second phase sensor, configured to detect a second rotation phase of the second photosensitive part, the method comprising:

when the first phase sensor detects a first preset phase signal, controlling the first motor to stop rotation after delaying a first variable time; and/or when the second phase sensor detects a second preset phase signal, controlling the second motor to stop rotation after delaying a second variable time, wherein after both the first motor and the second motor stop rotation, a phase difference between the first photosensitive part and the second photosensitive part is less than or equal to a preset phase difference threshold, and when a print speed of the image-forming apparatus is a first print speed, using a third sub-variable time to perform a phase match operation on the first photosensitive part and the second photosensitive part; and when the print speed of the image-forming apparatus is a second print speed, using a fourth sub-variable time to perform the phase match operation on the first photosensitive part and the second photosensitive part, wherein when the first print speed is greater than the second print speed, the third sub-variable time is less than the fourth sub-variable time.

16. The phase match method according to claim 15, further including:

after a previous phase match operation for the first photosensitive part and the second photosensitive part is completed and at least one of the first motor and the second motor receives a phase match instruction, when a first preset condition is satisfied, using a new first variable time and/or a new second variable time to perform phase match on the first photosensitive part and the second photosensitive part, wherein the new first variable time is different from the first variable time corresponding to the previous phase match operation, and the new second variable time is different from the second variable time corresponding to the previous phase match operation; or after a previous phase match operation for the first photosensitive part and the second photosensitive part is completed and at least one of the first motor and the second motor receives a phase match instruction, when a second preset condition is satisfied, using the first variable time and/or the second variable time corresponding to the previous phase match operation to perform phase match on the first photosensitive part and the second photosensitive part.

* * * * *